United States Patent
Hampel et al.

(10) Patent No.: US 10,772,145 B2
(45) Date of Patent: Sep. 8, 2020

(54) AUTONOMOUS FORMATION FOR BACKHAUL NETWORKS

(71) Applicant: QUALCOMM Incorporated, San Diego, CA (US)

(72) Inventors: Karl Georg Hampel, Hoboken, NJ (US); Hong Cheng, Bridgewater, NJ (US); Soo Bum Lee, San Diego, CA (US); Gavin Bernard Horn, La Jolla, CA (US); Vincent Douglas Park, Falls Church, VA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/913,016

(22) Filed: Mar. 6, 2018

(65) Prior Publication Data

US 2018/0288823 A1    Oct. 4, 2018

Related U.S. Application Data

(60) Provisional application No. 62/478,434, filed on Mar. 29, 2017.

(51) Int. Cl.
*H04W 76/15* (2018.01)
*H04L 12/741* (2013.01)
(Continued)

(52) U.S. Cl.
CPC ............ *H04W 76/15* (2018.02); *H04B 7/155* (2013.01); *H04L 45/74* (2013.01); *H04W 24/02* (2013.01);
(Continued)

(58) Field of Classification Search
CPC ..... H04L 47/10; H04L 12/5602; H04L 47/27; H04L 2012/5635; H04L 45/02;
(Continued)

(56) References Cited

U.S. PATENT DOCUMENTS

| | | | |
|---|---|---|---|
| 2009/0190521 A1* | 7/2009 | Horn ................... | H04W 40/248 370/315 |
| 2011/0051702 A1* | 3/2011 | Billhartz ................. | H04L 45/00 370/338 |

(Continued)

OTHER PUBLICATIONS

International Search Report and Written Opinion—PCT/US2018/021360—ISA/EPO—dated May 22, 2018.

*Primary Examiner* — Brenda H Pham
(74) *Attorney, Agent, or Firm* — Holland & Hart LLP

(57) ABSTRACT

A user equipment (UE) may experience poor communication with a network access device, and the network access device may configure the UE to connect to, and route communications through, one or more relay nodes (e.g., which may be another UE, a network operator-deployed relay, etc.). Techniques are described whereby these relay nodes may autonomously form a wireless backhaul network. Sequential implementations are considered such that the size of the wireless backhaul network may scale efficiently. In some examples, the wireless backhaul network may form by reusing existing connectivity establishment procedures. Importantly, the proposed techniques enable a relay to possess (e.g., be configured with) functionality that may traditionally be associated with a UE, base station, and gateway. Such multi-faceted functionality may enable the described sequential formation of wireless backhaul networks with tree topology.

17 Claims, 13 Drawing Sheets

(51) Int. Cl.
*H04B 7/155* (2006.01)
*H04W 24/02* (2009.01)
*H04W 88/16* (2009.01)
*H04W 92/20* (2009.01)
*H04W 84/04* (2009.01)
*H04W 88/04* (2009.01)
*H04W 40/24* (2009.01)
*H04W 36/08* (2009.01)
*H04B 7/26* (2006.01)
*H04W 40/02* (2009.01)

(52) U.S. Cl.
CPC ........... *H04B 7/2606* (2013.01); *H04W 36/08* (2013.01); *H04W 40/02* (2013.01); *H04W 40/24* (2013.01); *H04W 84/045* (2013.01); *H04W 84/047* (2013.01); *H04W 88/04* (2013.01); *H04W 88/16* (2013.01); *H04W 92/20* (2013.01)

(58) Field of Classification Search
CPC ......... H04L 41/12; H04L 45/00; H04L 45/04; H04L 43/12; H04L 41/04; H04L 12/56; H04L 2012/56; H04L 45/74; H04W 80/04; H04W 8/26; H04W 76/15; H04W 24/02; H04W 88/16; H04W 92/20; H04W 84/045; H04W 88/04; H04W 40/24; H04W 36/08; H04W 84/047; H04W 40/02; H04B 7/155; H04B 7/2606
USPC .... 370/349, 310.2, 400, 328, 338, 231, 255, 370/254, 389
See application file for complete search history.

(56) References Cited

U.S. PATENT DOCUMENTS

| | | | |
|---|---|---|---|
| 2012/0140701 A1* | 6/2012 | Huang | H04B 7/15528 370/315 |
| 2013/0238769 A1* | 9/2013 | Asati | H04L 61/103 709/220 |
| 2014/0089503 A1* | 3/2014 | Thyni | H04L 41/0668 709/224 |
| 2016/0135107 A1 | 5/2016 | Hampel et al. | |
| 2016/0150459 A1* | 5/2016 | Patil | H04L 45/72 370/328 |
| 2016/0182402 A1* | 6/2016 | Carames | H04L 47/808 709/225 |
| 2016/0192439 A1 | 6/2016 | Phuyal et al. | |

* cited by examiner

AUTONOMOUS FORMATION FOR BACKHAUL NETWORKS

CROSS REFERENCES

The present application for patent claims priority to U.S. Provisional Patent Application No. 62/478,434 by Hampel et al., entitled "Autonomous Formation For Backhaul Networks," filed Mar. 29, 2017, assigned to the assignee hereof.

BACKGROUND

The following relates generally to wireless communication, and more specifically to autonomous formation for backhaul networks.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In some cases, a UE may experience poor communication with a network access device, and the network access device may configure the UE to connect to, and route communications through, one or more relays (e.g., which may be another UE, a network operator-deployed relay). A data routing path between a UE and a Donor eNodeB (DeNB) may include a single relay node (RN) that is transparent to the UE. In some cases, however, it may be desirable for a data routing path to contain multiple such relays. The rollout of such highly densified networks may create a backhaul issue in the absence of wireless backhauling. Accordingly, techniques directed to multi-hop wireless backhaul networks (e.g., such that the data routing path between the UE and donor contains multiple relays) may be desired. For example, such multi-hop wireless backhauling may be important for the rollout of millimeter wave (mmW) access technologies (e.g., because the limited range of mmW-based communications may result in highly densified, small-cell deployments). For the support of wireless backhauling, it may be desirable to enable new relays to autonomously attach to already-integrated relays (e.g., by reusing existing packet data network (PDN) connectivity establishment procedures, and thereby obtaining network connectivity (e.g., data network (DN) connectivity) to the donor).

SUMMARY

Techniques are described whereby the communication range of a wireless device may be extended through the use of multiple relays, which may autonomously form a wireless backhaul network. Such autonomously formed wireless backhaul networks may be beneficial for communications systems that support transmissions over frequency bands that experience large degrees of signal attenuation or systems that would otherwise benefit from the expanded coverage offered by relay techniques. Additionally, these wireless backhaul networks may provide cost-efficient alternatives (or supplements) to infrastructure-based wired relay solutions. Sequential (e.g., recursive) implementations are considered such that the size of the wireless backhaul network may scale efficiently. In some examples, the wireless backhaul network may be formed by reusing existing connectivity establishment procedures. Importantly, the proposed techniques enable a relay to possess (e.g., be configured with) functionality that may traditionally be associated with a user equipment (UE), base station (BS), and gateway (GW). Such multi-faceted functionality may enable the described sequential formation of wireless backhaul networks with tree topology.

A method of wireless communication is described. The method may include establishing a first connection to a first data network (DN) via a wireless link with a network node, receiving, from a second relay, a packet data unit (PDU) session request, forwarding the PDU session request to a network management function, identifying a DN address for the second relay, establishing a second connection to a second DN for the second relay, and connecting the second relay to the first DN by routing data from the first DN to the second DN based on the identified DN address.

An apparatus for wireless communication is described. The apparatus may include means for establishing a first connection to a first DN via a wireless link with a network node, means for receiving, from a relay (e.g., a second relay), a PDU session request, means for forwarding the PDU session request to a network management function, means for identifying a DN address for the relay (e.g., the second relay), means for establishing a second connection to a second DN for the relay (e.g., the second relay), and means for connecting the relay (e.g., the second relay) to the first DN by routing data from the first DN to the second DN based on the identified DN address.

Another apparatus for wireless communication is described. The apparatus may include a processor, memory in electronic communication with the processor, and instructions stored in the memory. The instructions may be operable to cause the processor to establish a first connection to a first DN via a wireless link with a network node, receive, from a relay (e.g., a second relay), a PDU session request, forward the PDU session request to a network management function, identify a DN address for the relay (e.g., the second relay), establish a second connection to a second DN for the relay (e.g., the second relay), and connect the relay (e.g., the second relay) to the first DN by routing data from the first DN to the second DN based on the identified DN address.

A non-transitory computer readable medium for wireless communication is described. The non-transitory computer-readable medium may include instructions operable to cause a processor to establish a first connection to a first DN via a wireless link with a network node, receive, from a relay (e.g., a second relay), a PDU session request, forward the PDU session request to a network management function, identify a DN address for the relay (e.g., the second relay), establish a second connection to a second DN for the relay (e.g., the second relay), and connect the relay (e.g., the second relay) to the first DN by routing data from the first DN to the second DN based on the identified DN address.

In some examples of the method, apparatus, and non-transitory computer-readable medium described above, the network management function resides on at least one of the network node, a core network (CN), a radio access network (RAN) node, a donor node, or an anchor node.

In some examples of the method, apparatus, and non-transitory computer-readable medium described above, forwarding the PDU session request includes including a gateway address of the first relay in the PDU session request. Some examples of the method, apparatus, and non-transitory computer-readable medium described above may further include processes, features, means, or instructions for forwarding the PDU session request on the first connection.

In some examples of the method, apparatus, and non-transitory computer-readable medium described above, at least one of the first DN or the second DN may be one of a packet data network (PDN), an Internet Protocol (IP) network, a local area network (LAN), a backhaul network, a self-backhaul network, or a wireless multi-hop network.

In some examples of the method, apparatus, and non-transitory computer-readable medium described above, the first DN and the second DN may be both one of a PDN, an IP network, a LAN, a backhaul network, a self-backhaul network, or a wireless multi-hop network.

Some examples of the method, apparatus, and non-transitory computer-readable medium described above may further include processes, features, means, or instructions for receiving, from the network management function, a request to establish a gateway function for the second relay.

Some examples of the method, apparatus, and non-transitory computer-readable medium described above may further include processes, features, means, or instructions for forwarding the data from the network node to the second relay by exchanging the data between the first connection to the first DN and the second connection to the second DN.

In some examples of the method, apparatus, and non-transitory computer-readable medium described above, establishing the second connection to the second DN for the second relay includes configuring at least one data radio bearer (DRB) between the first relay and the second relay. Some examples of the method, apparatus, and non-transitory computer-readable medium described above may further include processes, features, means, or instructions for forwarding data received from the network node to the at least one DRB based on the identified DN address.

Some examples of the method, apparatus, and non-transitory computer-readable medium described above may further include processes, features, means, or instructions for establishing a mapping between the at least one DRB and the identified DN address for the second relay. Some examples of the method, apparatus, and non-transitory computer-readable medium described above may further include processes, features, means, or instructions for updating a forwarding information base (FIB) based on the mapping.

In some examples of the method, apparatus, and non-transitory computer-readable medium described above, the mapping may be based on a correlation identifier (ID) associated with the second relay.

In some examples of the method, apparatus, and non-transitory computer-readable medium described above, identifying the DN address includes receiving, from the network management function, a DN address prefix. In some examples of the method, apparatus, and non-transitory computer-readable medium described above, the method further comprising determining the DN address for the second relay based on the DN address prefix. Some examples of the method, apparatus, and non-transitory computer-readable medium described above may further include processes, features, means, or instructions for transmitting the DN address to the second relay.

In some examples of the method, apparatus, and non-transitory computer-readable medium described above, the DN address includes a second DN address prefix.

Some examples of the method, apparatus, and non-transitory computer-readable medium described above may further include processes, features, means, or instructions for updating a FIB at the first relay based on the determined DN address.

In some examples of the method, apparatus, and non-transitory computer-readable medium described above, the determined DN address includes a DN address of a set of DN addresses determined based on the DN address prefix.

In some examples of the method, apparatus, and non-transitory computer-readable medium described above, the identified DN address may be preconfigured or determined via a pseudo-random function.

In some examples of the method, apparatus, and non-transitory computer-readable medium described above, the DN address may be determined based on a stateless address autoconfiguration (SLAAC).

In some examples of the method, apparatus, and non-transitory computer-readable medium described above, identifying the DN address includes transmitting, to the network node, a DN address request for the second relay based on the PDU session request. Some examples of the method, apparatus, and non-transitory computer-readable medium described above may further include processes, features, means, or instructions for receiving a DN address response based on the DN address request, where the DN address response indicates the DN address for the second relay.

In some examples of the method, apparatus, and non-transitory computer-readable medium described above, the DN address request indicates a requested DN address for the second relay.

Some examples of the method, apparatus, and non-transitory computer-readable medium described above may further include processes, features, means, or instructions for updating a FIB at the first relay based on the DN address for the second relay.

In some examples of the method, apparatus, and non-transitory computer-readable medium described above, identifying the DN address includes determining the DN address for the second relay based on the PDU session request. Some examples of the method, apparatus, and non-transitory computer-readable medium described above may further include processes, features, means, or instructions for transmitting, to the network node, an indication of the determined DN address for the second relay.

In some examples of the method, apparatus, and non-transitory computer-readable medium described above, establishing the second connection to the second DN includes receiving a first non-access stratum (NAS) message from the second relay, the first NAS message indicating the PDU session request. Some examples of the method, apparatus, and non-transitory computer-readable medium described above may further include processes, features, means, or instructions for forwarding the first NAS message to the network management function.

Some examples of the method, apparatus, and non-transitory computer-readable medium described above may further include processes, features, means, or instructions for receiving, from the network node, a packet indicating the DN address for the second relay. Some examples of the method, apparatus, and non-transitory computer-readable medium described above may further include processes, features, means, or instructions for transmitting the packet to the second relay.

Some examples of the method, apparatus, and non-transitory computer-readable medium described above may further include processes, features, means, or instructions for receiving, from the network node, an address management message indicating a DN address management scheme, where identifying the DN address may be based on the DN address management scheme.

Some examples of the method, apparatus, and non-transitory computer-readable medium described above may further include processes, features, means, or instructions for receiving, from the network node, an address management message indicating a FIB update scheme. Some examples of the method, apparatus, and non-transitory computer-readable medium described above may further include processes, features, means, or instructions for updating a FIB based on the FIB update scheme.

Some examples of the method, apparatus, and non-transitory computer-readable medium described above may further include processes, features, means, or instructions for exchanging one or more signaling messages between the network management function and the second relay.

Some examples of the method, apparatus, and non-transitory computer-readable medium described above may further include processes, features, means, or instructions for determining packet forwarding rules based on the PDU session request forwarded from the second relay to the network management function.

In some examples of the method, apparatus, and non-transitory computer-readable medium described above, establishing the first connection to the first DN includes transmitting, to the network node, a radio resource control (RRC) connection request message. Some examples of the method, apparatus, and non-transitory computer-readable medium described above may further include processes, features, means, or instructions for receiving, from the network node, an RRC response message.

Some examples of the method, apparatus, and non-transitory computer-readable medium described above may further include processes, features, means, or instructions for receiving, from the network node, a response to the PDU session request, where the response includes a Create Session Request message.

Some examples of the method, apparatus, and non-transitory computer-readable medium described above may further include processes, features, means, or instructions for identifying the DN address for the second relay may be based on the Create Session Request message.

Some examples of the method, apparatus, and non-transitory computer-readable medium described above may further include processes, features, means, or instructions for determining a correlation identifier (ID) for the second relay based on the Create Session Request message.

Some examples of the method, apparatus, and non-transitory computer-readable medium described above may further include processes, features, means, or instructions for transmitting, to the network node, a Create Session Response message indicating the correlation ID. Some examples of the method, apparatus, and non-transitory computer-readable medium described above may further include processes, features, means, or instructions for receiving, from the network node, a setup request based on the Create Session Response message.

In some examples of the method, apparatus, and non-transitory computer-readable medium described above, the PDU session request indicates a network name.

In some examples of the method, apparatus, and non-transitory computer-readable medium described above, the DN address may include an address for an IP network, an 802.1 LAN, or a PDN.

DETAILED DESCRIPTION

Techniques are described for transmitting a data packet between a remote user equipment (UE) and a network access device (e.g., a network node), core network (CN), radio access network (RAN), etc. via multiple relays. The proposed techniques allow each relay to autonomously connect to a donor (or anchor) node using a packet data unit (PDU) Session Request procedure that resembles the procedure used by a UE to connect to a base station. In aspects of the present disclosure, packet data network (PDN) and data network (DN) may be used interchangeably. Further, a PDU session may generally be understood as referring to connectivity to a DN (i.e., DN connectivity) for a UE, a group of UEs, a relay, etc. Using the described techniques, one or more relays may autonomously establish a wireless self-backhaul network via sequential attachment of new relays to integrated relays. Each relay may thereby comprise UE-functionality to request radio resource control (RRC) connection to the next generation eNodeB (gNB) functionality (e.g., which may also be referred to as base station functionality) offered by a parent relay (or donor). The UE-functionality may further enable a PDU session established via the RRC connection to the parent relay (or donor). When integrated, the relay may provide gNB functionality as well as gateway (GW) functionality to furnish child relays and/or UEs with RRC and PDU sessions. Each relay may route packets from the DN shared with its parent (or donor) to the DN shared with its children (e.g., based on the DN address of each child).

Aspects of the disclosure are initially described in the context of a wireless communications system. Aspects are then described with respect backhaul networks and process flows. Aspects of the disclosure are further illustrated by and described with reference to apparatus diagrams, system diagrams, and flowcharts that relate to autonomous formation for backhaul networks.

Figure 1:
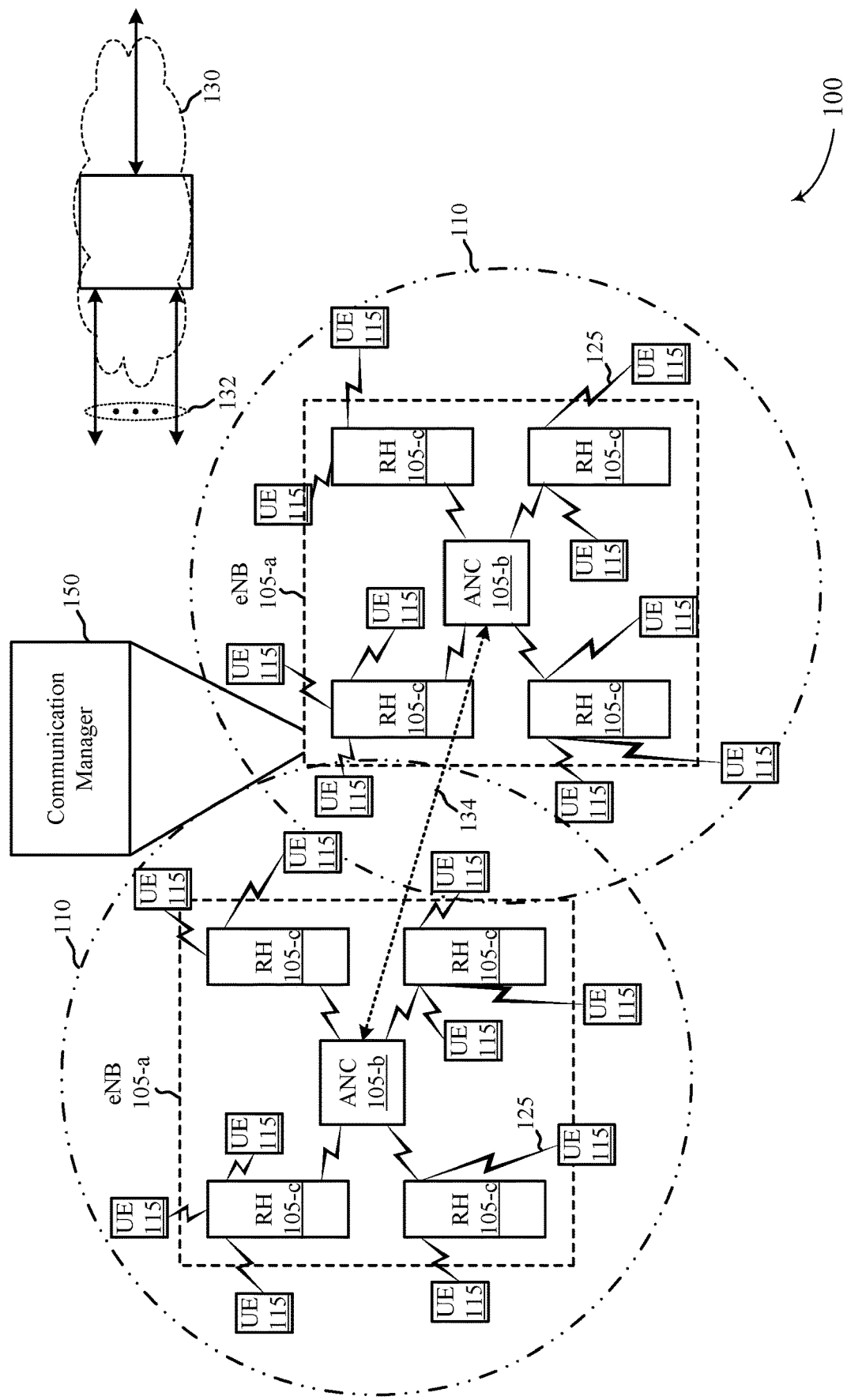
FIG. 1 shows a block diagram of a wireless communications system, in accordance with various aspects of the present disclosure.

FIG. 1 illustrates an example of a wireless communications system 100 in accordance with various aspects of the present disclosure. The wireless communications system 100 may include network access devices 105 (e.g., gNBs 105-a, access node controllers (ANCs) 105-b, and/or radio heads (RHs) 105-c), UEs 115, and a CN 130. The CN 130 may provide user authentication, access authorization, tracking, Internet Protocol (IP) connectivity, and other access, routing, or mobility functions. In aspects, the CN 130 may alternatively be referred to as, or perform operations of, a network management function as described below. Additionally or alternatively, operations of the network management function may be performed by a radio access network (RAN) node, one or more network access devices 105, or any other suitable network-operated entity. At least some of the network access devices 105 (e.g., gNBs 105-a or ANCs 105-b) may interface with the CN 130 through backhaul links 132 (e.g., S1, S2) and may perform radio configuration and scheduling for communication with the UEs 115. In various examples, the ANCs 105-b may communicate, either directly or indirectly (e.g., through CN 130), with each other over backhaul links 134 (e.g., X1, X2), which may be wired or wireless communication links. Each ANC 105-b may also communicate with a number of UEs 115 through a number of smart RHs (e.g., RHs 105-c).

In an alternative configuration of the wireless communications system 100, the functionality of an ANC 105-b may be provided by a RH 105-c or distributed across the RHs 105-c of an gNB 105-a. In another alternative configuration of the wireless communications system 100 (e.g., a Long Term Evolution (LTE)/LTE-Advanced (LTE-A) configuration), the RHs 105-c may be replaced with base stations, and the ANCs 105-b may be replaced by base station controllers (or links to the CN 130). In some examples, the wireless communications system 100 may include a mix of RHs 105-c, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered RH or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs 115 in a closed subscriber group (CSG), UEs 115 for users in the home, and the like). A gNB 105-a for a macro cell may be referred to as a macro gNB. A gNB 105-a for a small cell may be referred to as a small cell gNB, a pico gNB, a femto gNB, or a home gNB. A gNB 105-a may support one or multiple (e.g., two, three, four, and the like) cells.

The wireless communications system 100 may support synchronous or asynchronous operation. For synchronous operation, the gNBs 105-a and/or RHs 105-c may have similar frame timing, and transmissions from different gNBs 105-a and/or RHs 105-c may be approximately aligned in time. For asynchronous operation, the gNBs 105-a and/or RHs 105-c may have different frame timings, and transmissions from different gNBs 105-a and/or RHs 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may in some cases perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the RRC protocol layer may provide establishment, configuration, and maintenance of an RRC connection between a UE 115 and a RH 105-c, ANC 105-b, or CN 130 supporting radio bearers for user plane data. At the Physical (PHY) layer, transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of gNBs 105-a, RHs 105-c, base stations, access points, or other network access devices, including macro gNBs, small cell gNBs, relay base stations, and the like. A UE 115 may also be able to communicate directly with other UEs 115 (e.g., using a peer-to-peer (P2P) protocol).

The communication links 125 shown in wireless communications system 100 may include uplinks (ULs) from a UE 115 to a RH 105-c, and/or downlinks (DLs), from a RH 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time division multiplexing (TDM) techniques, frequency division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels), overhead information, user data, etc. The communication links 125 may transmit bidirectional communications using frequency division duplexing (FDD) techniques (e.g., using paired spectrum resources) or time division duplexing techniques (e.g., using unpaired spectrum resources). Frame structures for FDD (e.g., frame structure type 1) and TDD (e.g., frame structure type 2) may be defined.

In some examples of the wireless communications system 100, network access devices 105 (e.g., RHs 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communications system 100 may support operation on multiple carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for carrier aggregation. Carrier aggregation may be used with both FDD and TDD component carriers.

In some examples, a network access device 105 may include a communication manager 150. In some examples, the communication manager 150 may include or be an example of the communications manager 715, 815, 915, or 1015 described with reference to FIG. 7, 8, 9, or 10, or may perform aspects of the methods described with reference to FIGS. 11 through 13.

A 5G (or New Radio (NR)) network may have a wide spectrum and include sub-6 GigaHertz (GHz) (Sub-6G) and mmW (e.g., 30-300 GHz) bands. The Sub-6G band (or bands) currently has wider cell coverage, but the mmW band (or bands) has larger bandwidth. To fully leverage the benefits of the 5G mmW band(s), a dense cell deployment may be necessary (e.g., because mmW devices typically require line-of-sight positioning for communication). One way to achieve a dense cell deployment is by deploying a large number of small cells. However, such a deployment may be costly, and may be difficult for an operator to justify in areas that do not have a large number of users (i.e., UEs 115). An alternative to deploying a large number of small cells is to enlist UEs 115 as communication relays. Additionally or alternatively, one or more operator-supported infrastructure-based relays may be provided. These relays may communicate with each other and one or more network access devices 105 via wireless backhaul links using techniques described herein.

Multi-hop wireless backhaul networks, e.g. using mmW technology, enable flexible and lower cost deployments of small cells. mmW technologies are especially well suited for extended wireless backhaul networks due to their support of narrow antenna beams, which highly reduces inter-link interference. Multi-hop wireless backhauling is also important for the rollout of mmW RATS. Due to the limited range of mmW-based access, mmW cells are inherently small in nature. To provide sufficient availability of mmW-based access to end UEs 115, highly densified small-cell deployments are necessary. The rollout of such highly densified networks creates a backhaul problem. Since mmW-based RAT offers high link capacity, it is possible to integrate access (e.g., DN connectivity) and backhaul and let mmW base stations backhaul their own access traffic in accordance with aspects of the present disclosure. It is also possible to support other access technologies (i.e., other than mmW) using a mmW-based backhaul.

Aspects of the present disclosure allows the BS functionality of the relay to be used for the attachment of additional relays. In some examples of the present disclosure, the relay may be capable of a GW function and a routing function to interconnect the DN shared with the parent relay (or donor) with the DN shared with the child relay. Further, the proposed techniques do not preclude relays from using their BS functionality to offer UE-based access (e.g., in addition to access for additional relays).

Figure 2:
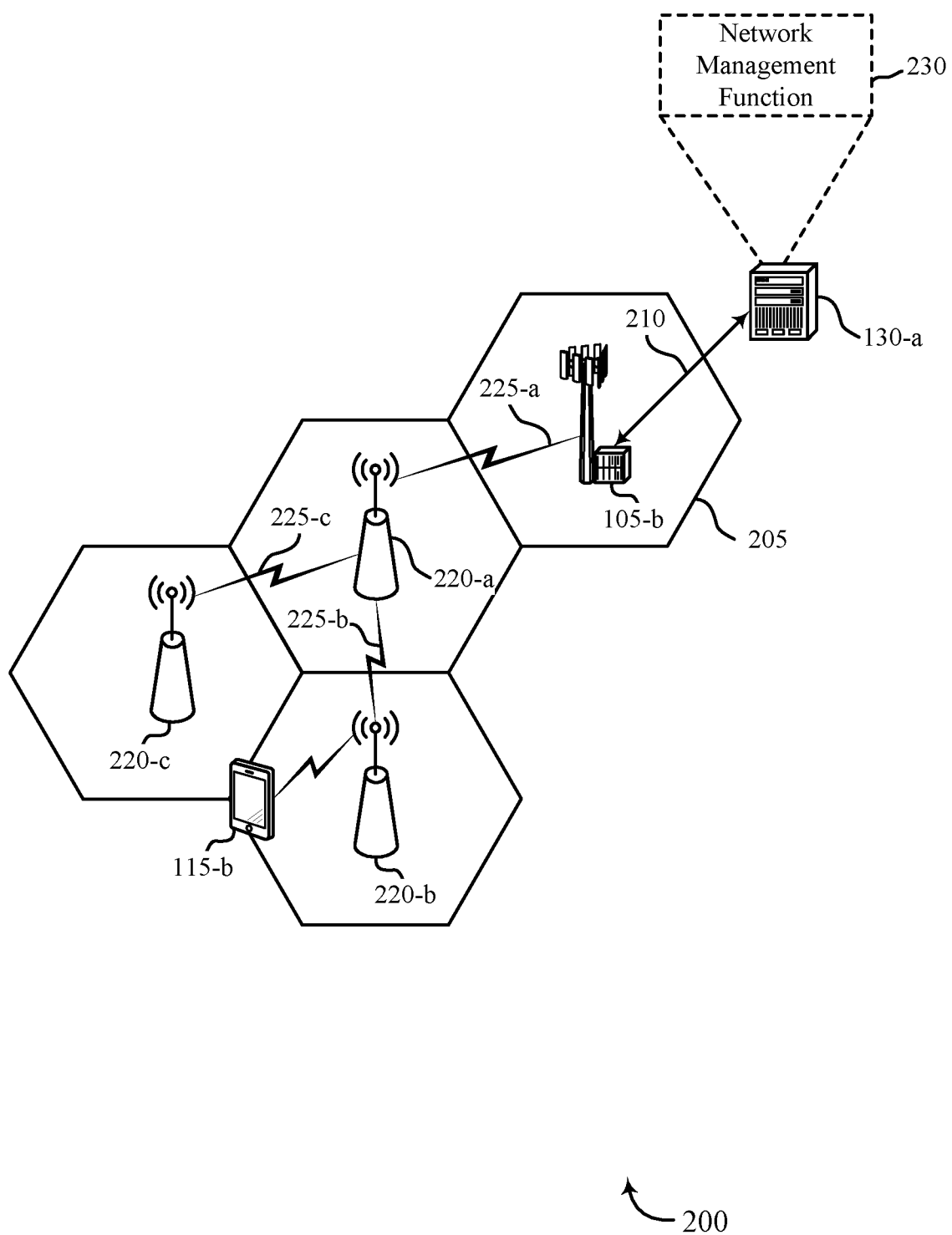
FIG. 2 illustrates an example wireless backhaul network that supports autonomous formation for wireless backhaul networks in accordance with various aspects of the present disclosure.

FIG. 2 shows an example of a wireless backhaul network 200 that supports autonomous formation for wireless backhaul networks in accordance with various aspects of the present disclosure. Wireless backhaul network 200 may support communications over mmW frequencies. As described above, transmissions in mmW bands may be associated with a limited range coverage areas 205, such that a dense cell deployment may be employed. It is to be understood that while the present disclosure is described with reference to mmW transmissions, the disclosed techniques may be applicable to any wireless communications system in which relay techniques are beneficial. In some examples, a network node such as a base station 105, CN 130, RAN node, or other suitable wireless device may include or perform operations of a network management function 230.

In accordance with aspects of the present disclosure, coverage area 205 associated with base station 105-b may be expanded (e.g., such that UE 115-b may communicate with the CN 130-a through base station 105-b) using multi-hop relay technique. As described above, base station 105-b (e.g., which may alternatively be referred to as donor 105-b or anchor 105-b) may communicate with relay 220-a via wireless backhaul 225-a. In some examples, base station 105-b may carry additional anchor or donor functionality.

Relay 220-a may in turn communicate with one or more additional relays 220 (e.g., relays 220-b, 220-c) via respective wireless backhauls (e.g., wireless backhauls 225-b, 225-c). As described above, each of these relays 220 may be a base station, an access point, a UE 115, or any other network node. The sequential addition of relays 220 (e.g., which may be enabled using aspects of the present disclosure) may create the multi-hop relay tree topology described herein.

As an example, relays 220-a, 220-b, and 220-c along with base station 105-b may autonomously form wireless backhaul network 200 such that communications from UE 115-b may be relayed (i.e., routed) to base station 105-b (e.g., which may serve as a proxy for CN 130-a) via relays 220-a, 220-b. In aspects of the present disclosure, relay 220-a may be referred to as a child relay with reference to base station 105-b and a parent relay with reference to relays 220-b, 220-c. Similarly, relays 220-b, 220-c may be referred to as child relays with reference to relay 220-a, and one or both may be a parent relay to one or more additional relays 220. In some cases, there may be a maximum number of relays 220 supported by a single cell (e.g., associated with base station 105-b). Wireless backhaul network 200 may be autonomously established using one or more of the techniques described below.

Interconnection between a parent relay (e.g., relay 220-a) and child (e.g., relay 220-b) may be accomplished using one or more of the following steps. First, relay 220-*b* may send a PDU Session Request in an RRC message to relay 220-*a*. Relay 220-*b* may then receive a DN address contained in an RRC message from relay 220-*a*. Relay 220-*a* may additionally or alternatively receive an RRC connection request from relay 220-*b*, establish an RRC connection to relay 220-*b*, and forward non-access stratum (NAS) messages received on this RRC connection to CN 130-*a* (e.g., via base station 105-*b*). Relay 220-*a* may then receive a Create Session Request from the CN 130-*a* for relay 220-*b*, determine a DN address for relay 220-*b*, and establish the PDU session for relay 220-*b* based on the determined DN address. Relay 220-*a* may forward data received on its DN connection with its parent relay (i.e., base station 105-*b*) to the DN connection of its child (i.e., relay 220-*b*) based on the determined DN address.

Because relay 220-*b* may act as a parent relay to another relay 220, the proposed aspects enable autonomous establishment of self-backhaul network 210 via sequential attachment of additional relays 220 to already integrated relays 220. Accordingly, each relay 220 may thereby comprise UE-functionality (i.e., to request RRC connection and a PDU session to a parent relay) as well as BS and GW functionality to furnish child relays 220 with RRC connectivity and PDU sessions. Each relay 220 may further route packets from the PDU session shared with its parent to the PDU session shared with its children based on the DN address(es) associated with one or more children.

Figure 3:
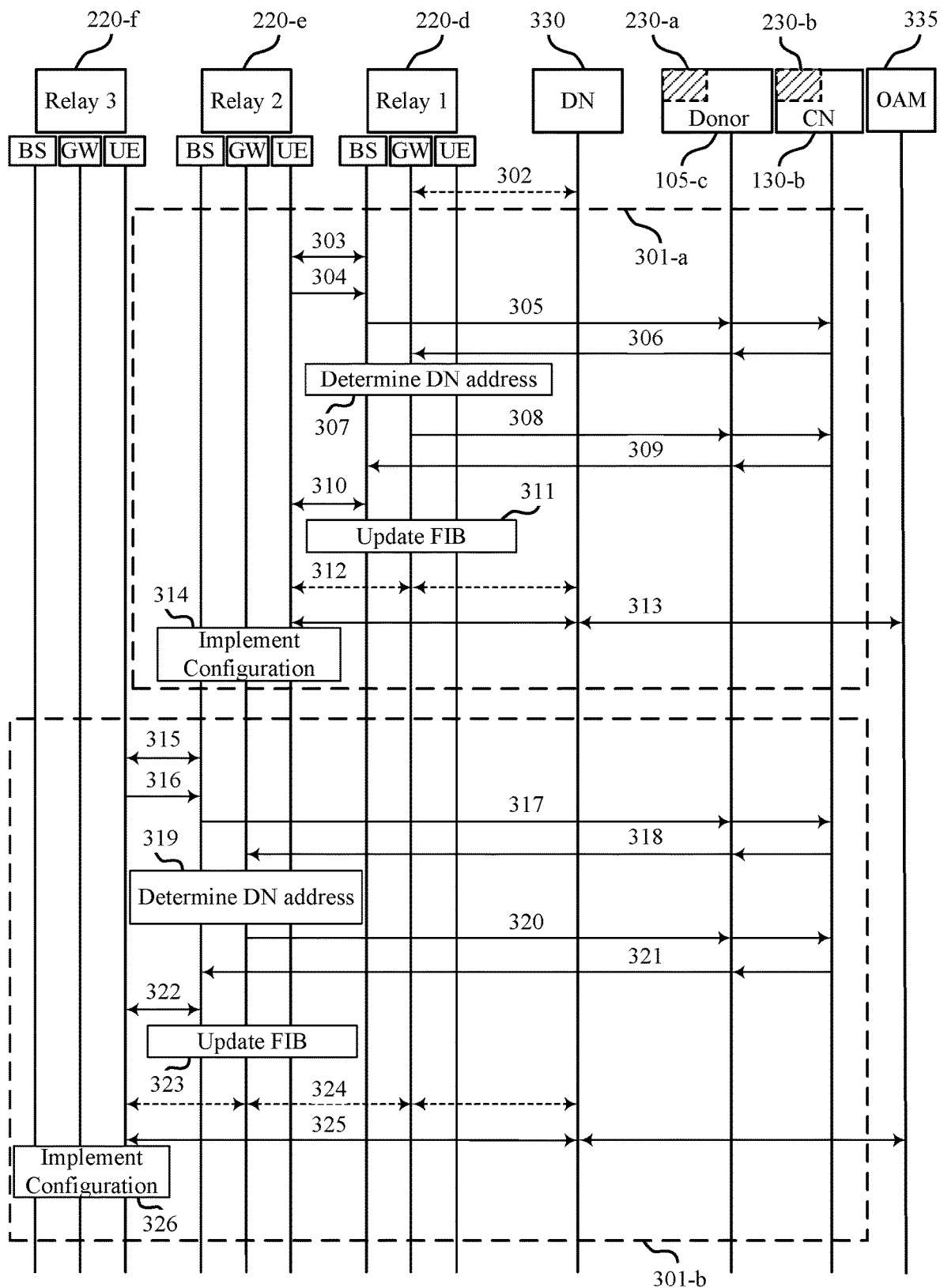
FIGS. 3 through 6 illustrate process flows that support autonomous formation for wireless backhaul networks in accordance with various aspects of the present disclosure.

FIG. 3 illustrates an example of a process flow 300 that supports autonomous formation for backhaul networks in accordance with various aspects of the present disclosure. Process flow 300 contains relays 220-*d*, 220-*e*, 220-*f*, each of which may be an example of a relay 220 described above. Donor 105-*c* may be an example of network node such as a base station 105-*b* and CN 130-*b* may be an example of the CN described above with reference to FIGS. 1 and 2. Data packets in process flow 300 are routed via DN 330. Process flow 300 additionally contains an operations and maintenance (OAM) server 335. In some examples described below, though only one DN is illustrated for the sake of simplicity, there may be multiple DNs 330 associated with process flow 300. Although illustrated separately, one or more of these features may be physically co-located or otherwise share one or more components.

Process flow 300 illustrates a method that allows relays 220 to autonomously integrate and form a multi-hop wireless backhaul network (e.g., wireless backhaul network 200 in FIG. 2). The proposed techniques may leverage cellular RAT and cellular signaling procedures to establish a layer 2 (L2) link and to obtain a PDU session. Additionally, the described techniques may enable wireless backhaul connectivity by interconnecting relays 220 and donor 105-*c* in the backhaul network via a routing plane. Further, a sequential mechanism of relay 220 integration, where each relay 220 reciprocates similar functionality to new attaching relays 220 as its parent relay 220 offered during its corresponding attachment, is described. This sequential mechanism may be applied to the establishment of L2 links and PDU sessions. Further, the sequential mechanism (in which a given type of node (e.g., a relay 220) may connect to another node of the same type (e.g., another relay 220)) represents one fundamental difference between the proposed techniques and the conventional techniques (where only one type of node (i.e., a relay 220) connects to a different type of node (i.e., a donor 105)).

Process flow 300 illustrates a sequence of activities whereby relay 220-*e* connects to relay 220-*d* (i.e., as shown by block 301-*a*) and relay 220-*f* subsequently connects to relay 220-*e* (i.e., as shown by block 301-*b*). The signaling procedures within block 301-*b* may be analogous to the corresponding procedures within block 301-*a*, which may demonstrate the sequential nature of the integration procedure and allows the size of the multi-hop wireless backhaul network to scale easily.

For the sake of simplicity, arrows within process flow 300 are referred to by the number directly above them. In some cases, multiple arrows associated with a given signaling process may be referred to collectively by a single number, though it is to be understood that these may be separate signals (e.g., as illustrated). Additionally, the functionality of each relay 220 is segmented into BS, GW, and UE functionality for explanation purposes. It is to be understood that these functionalities may in some cases share one or more physical (i.e., hardware) components or otherwise overlap.

At 302, relay 220-*d* may establish connectivity to DN 330. Accordingly, relay 220-*d* may possess a DN address (e.g., prior to the operations of block 301-*a*). Relay 220-*d* may further support BS and GW functionality. That is, relay 220-*d* may be integrated into the network and have DN connectivity. Through this DN connectivity, relay 220-*d* may communicate with CN 130-*b* and OAM server 335. Based on these communications, relay 220-*d* may establish BS functionality to allow additional relays 220 to attach.

The following steps 303 to 314 (i.e., block 301-*a*) describe the attachment of relay 220-*e* to relay 220-*d*. They may follow a connectivity procedure in which relay 220-*d* holds a GW and includes a DN address for its GW into the PDU Session Request sent to the CN 130-*b* at 305. Accordingly, the GW of relay 220-*d* may be responsible for determining the DN address of relay 220-*e*, as described further below with respect to FIGS. 4 through 6.

At 303, relay 220-*e* may discover relay 220-*d* and establish an RRC connection with relay 220-*d* (e.g., in the same or similar manner that a UE 115 connects to a base station 105). Accordingly, to enable 303, relay 220-*e* may support UE-functionality.

At 304, relay 220-*e* may send a PDU Session Request to relay 220-*d*.

At 305, relay 220-*d* may forward the PDU Session Request to donor 105-*c*, which may proxy for the CN 130-*b* and forward the request to the CN 130-*b*. In some examples, relay 220-*d* may include its GW's DN address in the request. Additionally or alternatively, relay 220-*d* may include a network name in the forwarded PDU Session Request.

At 306, CN 130-*b* may send a Create Session Request, which may be forwarded by donor 105-*c* to the DN address of the GW of relay 220-*d*. The request may include a request for information about relay 220-*e* (i.e., the source of the PDU session request at 304).

At 307, the GW of relay 220-*d* may determine a DN address for relay 220-*e*. In some examples, the GW of relay 220-*d* may additionally create a correlation identifier (ID).

At 308, the GW of relay 220-*d* may return a Create Session Response to the CN 130-*b* (e.g., with donor 105-*c* serving as a proxy). The Create Session Response may include information about relay 220-*e* and/or a correlation ID.

At 309, the CN 130-*b* may send an Initial Context Setup Request back to the BS function on relay 220-*d* (e.g., via donor 105-*c*) including the correlation ID.

At 310, the BS function of relay 220-*d* may configure at least one data radio bearer (DRB) with relay 220-*e* via an RRC Connection Reconfiguration message, in which the BS function of relay 220-*d* may include the DN address determined at 307.

At 311, the relay 220-*d* may create a mapping between the DN address allocated for relay 220-*e* and the DRB to relay 220-*e*, and it may enter this mapping into its forwarding information base (FIB). The correlation ID (e.g., created at 307) may be used for the establishment of this mapping.

At 312, and as a result of steps 303 to 311, the UE-functionality of relay 220-*e* may obtain DN connectivity via the GW of relay 220-*d*. The DN connectivity may be to the same DN 330 with which relay 220-*d* previously established connectivity or to another DN 330. In various examples, a DN 330 may be an example of a PDN, IP network, local area network (LAN), backhaul network, self-backhaul network, or wireless multi-hop network.

At 313, using the DN connectivity obtained at 312, relay 220-*e* may connect to OAM server 335 and may obtain a configuration for BS and GW functionality of its own.

At 314, relay 220-*e* may implement the configuration obtained from OAM server 335. In this manner, it may prepare to have new relays 220 attach. The BS functionality may additionally be used for UE-based access. In some cases, the BS functionality of relay 220-*e* may need to discover CN 130-*b*. Accordingly, it may use one or more known methods (e.g., Domain Name System (DNS) request, which is resolved to the IP address of donor 105-*c*). Thus, donor 105-*c* may become the CN 130-*b* proxy for the BS functionality of relay 220-*e* (e.g., in the same way that it served as CN 130-*b* proxy for the BS functionality of relay 220-*d*).

The following steps 315 to 326 (i.e., block 301-*b*) describe the attachment of relay 220-*f* to relay 220-*e*. In some examples, attachment of relay 220-*f* to relay 220-*e* may follow the same or similar procedures as the attachment of relay 220-*e* to relay 220-*d* (i.e., block 301-*a*). In some cases, relay 220-*e* may use the DN address obtained at 310 (i.e., when attaching to relay 220-*d*) as the GW address at 317 (i.e., when requesting attachment of relay 220-*f*). Such a sequential procedure may enable attachment of further generations of child relays 220.

At 315, relay 220-*f* may discover relay 220-*e* and establishes an RRC connection with relay 220-*e*. Accordingly, to enable 315, relay 220-*f* may support UE-functionality and relay 220-*e* may support BS-functionality.

At 316, relay 220-*f* may send a PDU session request to relay 220-*e*.

At 317, relay 220-*e* may forward the PDU session request to donor 105-*c*, which may proxy for the CN 130-*b* and forward the request to the CN 130-*b*. Relay 220-*e* may include its GW's DN address in the request. In some cases, the GW DN address may be the DN address that relay 220-*e* obtained at 310. In some cases, relay 220-*e* may include a network name in the request.

At 318, CN 130-*b* may send a Create Session Request, which may be forwarded by donor 105-*c* to the DN address of the GW of relay 220-*e*. The request may include a request for information about relay 220-*f* (i.e., the source of the PDU session request of 316).

At 319, the GW of relay 220-*e* may determine a DN address for relay 220-*f*. In some examples, the GW of relay 220-*e* may additionally create a correlation ID.

At 320, the GW of relay 220-*e* may return a Create Session Response to the CN 130-*b* (e.g., with donor 105-*c* serving as a proxy). The Create Session Response may include information about relay 220-*f* and/or a correlation ID.

At 321, the CN 130-*b* may send an Initial Context Setup Request back to the BS function on relay 220-*e* (e.g., via donor 105-*c*) including the correlation ID.

At 322, the BS function of relay 220-*e* may configure at least one DRB with relay 220-*f* via an RRC Connection Reconfiguration message, in which the BS function of relay 220-*e* may include the DN address determined at 319.

At 323, the relay 220-*e* may create a mapping between the DN address allocated for relay 220-*f* and the DRB to relay 220-*f*, and it may enter this mapping into its FIB. The correlation ID may be used for the establishment of this mapping.

At 324, and as a result of steps 315 to 323, the UE-functionality of relay 220-*f* may obtain DN connectivity via the GW of relay 220-*e*. The DN connectivity may be to the same DN 330 with which relay 220-*d* and/or relay 220-*e* previously established connectivity or to another DN 330. In such instances, packets may be exchanged between a first DN (e.g., the DN to which relay 220-*d* established connectivity) and a second DN (to which relay 220-*e* established connectivity). In various examples, a DN 330 may be an example of a PDN, IP network, LAN, backhaul network, self-backhaul network, or wireless multi-hop network.

At 325, using the DN connectivity obtained at 324, relay 220-*f* may connect to OAM server 335 and may obtain a configuration for BS and GW functionality of its own.

At 326, relay 220-*f* may implement the configuration obtained from OAM server 335. In this manner, it may prepare to have new relays 220 attach. The BS functionality may additionally be used for UE-based access. In some cases, the BS functionality of relay 220-*f* may need to discover CN 130-*b*. Accordingly, it may use one or more known methods (e.g., DNS request, which is resolved to the IP address of donor 105-*c*). Thus, donor 105-*c* may become the CN 130-*b* proxy for the BS functionality of relay 220-*f*.

Accordingly, as illustrated by process flow 300, relays 220 may attach to each other in order to build a multi-hop relay chain. Further, multiple relays 220 may attach to the same parent relay 220, thereby creating multi-hop spanning tree topologies.

In another example, the PDU session request may be handled by a network management function 230. The network management function 230 may reside within a network node such as a CN 130-*b* (i.e., network management function 230-*b*), a RAN node, donor 105-*c* (i.e., network management function 230-*a*), etc. The network management function 230 may receive the PDU session request message (e.g., at 305 or 317), send a Create Session Request message (e.g., at 306 or 318) to the corresponding GW address contained in the PDU session request message, receive a PDU Session Response message from the GW (e.g., at 308 or 320) and send an Initial Context Setup Request to a BS functionality of relay 220-*d* or relay 220-*e* (e.g., at 309 or 321), for example. Accordingly, in some examples, process flow 300 may operate based in part on a network management function 230 which may take the role of the CN 130-*b*. The network management function 230 may reside at any suitable location (e.g., within CN 130-*b* or donor 105-*c*) or may be a separate entity.

In another example, relay 220-*d* may include a GW address in the PDU session request at 305, and the Create Session Request at 306 may be addressed to the GW address included in the PDU session request at 305. At 307, relay 220-*d* may further identify a DN address and may map the DN address to a correlation ID, which it may send at 308 to relay 220-*e* (i.e., the source of the Create Session Request at 304). The relay 220-*d* may receive the correlation ID (e.g. in the Initial Context Setup Request at 309) and may establish an L2 link with relay 220-*e* including at least one DRB at 310. Relay 220-*d* may then allow forwarding of data packets between the DN address identified at 307 and the L2 link established with relay 220-*e* based on the correlation ID received at 309. Similar processes may be applied to the corresponding steps of block 301-*b* (i.e., 317 to 322). Accordingly, alternatives may be considered in which process flow 300 operates without the use of a CN 130-*b* (or a network management function 230, for example).

In yet another example, relay 220-*e* may create a second PDU Session via a second PDU Session request message, which may coexist with the first PDU Session created at 304 through 311. The GW used for the second PDU Session may reside at a different location from the GW used for the first PDU Session (e.g., it may reside outside of relay 220-*d* (e.g., at donor 105-*c*)). Further, data exchanged on the second PDU Session may be tunneled over the first PDU Session. In a variation of process flow 300, it may be possible for relay 220-*e* to connect to the OAM 335 via the second PDU Session (e.g., instead of or in addition to connecting via the first PDU Session). The establishment of a second PDU Session may also be applied by relay 220-*f* when integrating to the network via relay 220-*e*. The integrating relays 220 may, for instance, may use different DN names (DNNs) when requesting establishment of the first PDU Session and the second PDU Session. In this manner, the parent relay 220 may distinguish how to handle the PDU session request messages.

Figure 4:
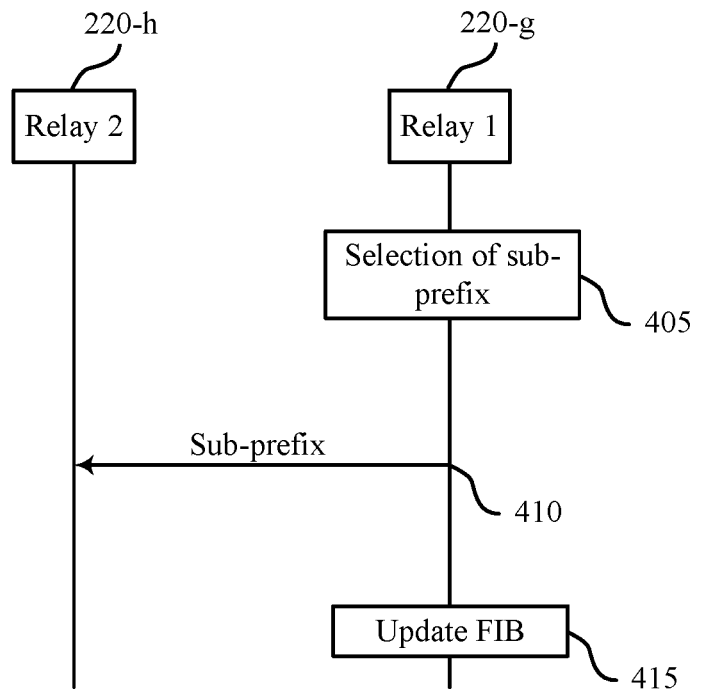

FIG. 4 illustrates an example of a process flow 400 that supports autonomous formation for backhaul networks in accordance with various aspects of the present disclosure. Process flow 400 includes network nodes such as a relay 220-*g* and a relay 220-*h*, each of which may be an example of a relay 220 described above. In this example, relay 220-*g* may represent a parent relay for relay 220-*h*. Relay 220-*g* may in turn be a child of another relay 220, a donor 105, or any other network node. Relay 220-*h* may not yet have a child relay (e.g., relay 220-*h* may not yet have been configured by an OAM server for BS and GW functionality).

Process flow 400 illustrates a technique for DN addressing via sequential sub-prefixing. At 405, relay 220-*g* may select a DN address sub-prefix of its own prefix. That is, each relay 220 may obtain a DN address prefix (or set of DN addresses) from its parent relay 220 instead of a single DN address. When the relay 220 (e.g., relay 220-*g*) has to determine a DN address prefix for an attaching child relay 220 (e.g., relay 220-*h*), it may select a sub-prefix of its own prefix.

At 410, relay 220-*g* may forward the selected prefix to relay 220-*h*. At 415, relay 220-*g* may enter the mapping between the selected prefix for relay 220-*h* and the L2 link or one or more DRBs of relay 220-*h* into its FIB table. Such an addressing scheme may lead to a hierarchical address distribution over the topological tree. Consequently, assignment of DN address prefixes for a new child relay 220 (e.g., a relay 220 attaching to relay 220-*h* or another relay 220 attaching to relay 220-*g*) may not require any FIB update at higher nodes of the tree.

Figure 5:
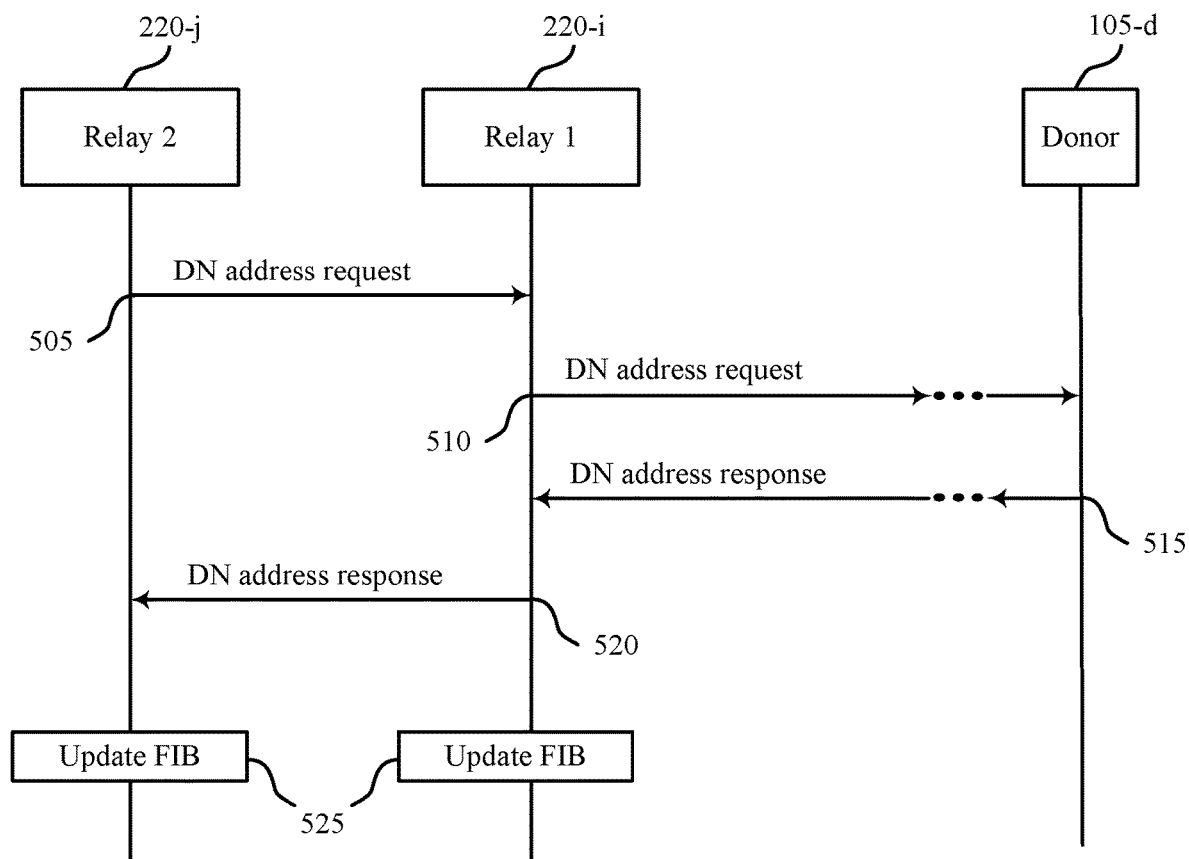

FIG. 5 illustrates an example of a process flow 500 that supports autonomous formation for backhaul networks in accordance with various aspects of the present disclosure. Process flow 500 includes relay 220-*i* and relay 220-*j*, each of which may be an example of a relay 220 described above. In this example, relay 220-*i* may represent a parent relay for relay 220-*j*. Relay 220-*i* may in turn be a child of a network node such as another relay 220 or donor 105-*d*. In the present example, relay 220-*j* has an attaching child relay 220 (not shown).

Process flow 500 illustrates a technique for sequential DN address request/response upstream signaling. At 505, relay 220-*j* may send a DN address request upstream (i.e., towards donor 105-*d*) for its attaching child relay 220. In some examples, the request may be sent as an RRC message to the parent relay 220 (i.e., relay 220-*i*), which may forward the request to its own parent relay 220 at 510, etc. until the DN address request reaches donor 105-*d*. Additionally or alternatively, the DN address request may be sent to donor 105-*d* on the data plane. For example, the destination address of the CN may be used in the data plane (e.g., because the donor 105-*d* represents the CN proxy).

Accordingly, donor 105-*d* may be the central address managing entity in this approach. In some cases, address management may be performed by a network management function. At 515 donor 105-*d* may allocate a DN address and return it downstream via RRC messaging or data-plane messaging. The DN address response may propagate back through the backhaul network until it reaches relay 220-*j* at 520. For example, the response message may be forwarded along the correct path in the case that each relay 220 applies reverse-path learning based on the DN address request message that originated at 505 and propagated through the backhaul network at 510. In some cases (e.g., when the response message is passed on the data plane), the response may carry the DN address of the destination (i.e., the DN address of the child relay 220 attaching to relay 220-*j*).

For both RRC-based and data-plane forwarding, intermediate relays 220 (e.g., relay 220-*i*) may update the FIB at 525 based on the new DN address contained in the DN address response message. This updating may be in contrast to the example illustrated in process flow 400 in which assignment of DN address sub-prefixes for a new child relay 220 does not require any FIB updating at higher nodes of the tree. In some cases (e.g., if the PDU type is IP), the Dynamic Host Configuration Protocol (DHCP) request/response mechanism may be used.

Figure 6:
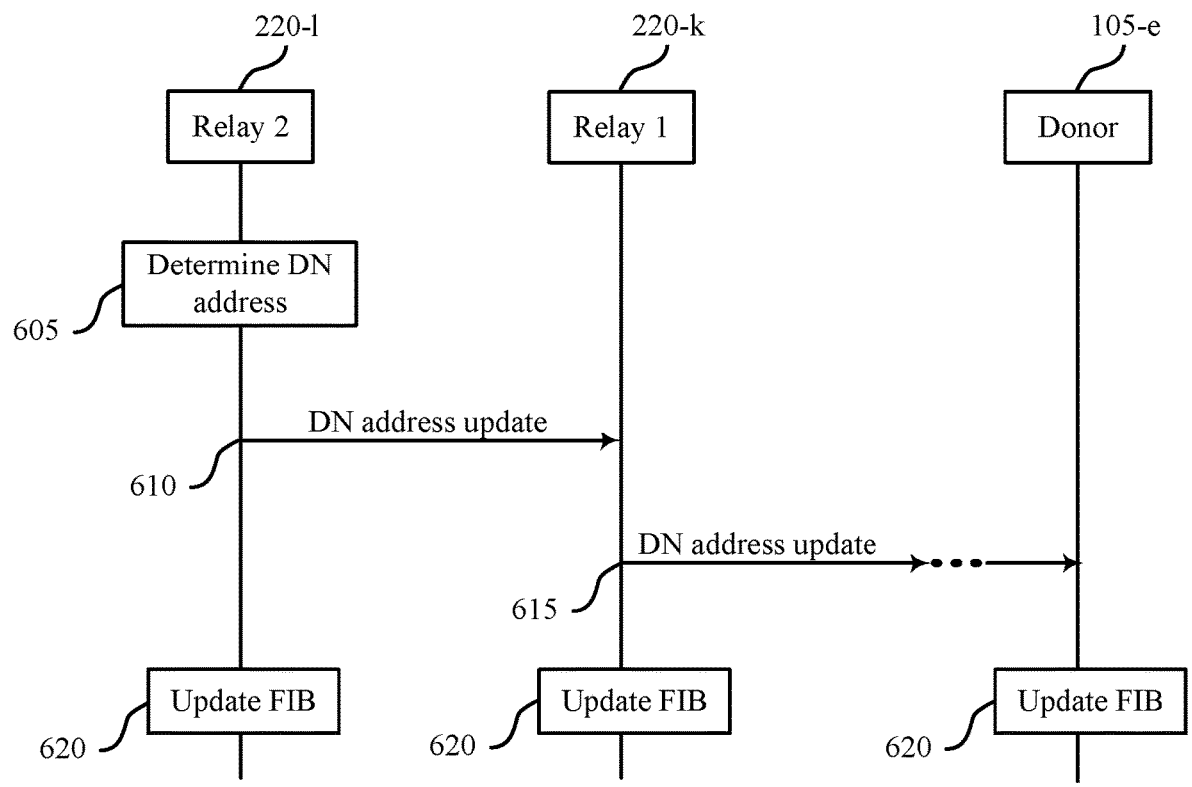

FIG. 6 illustrates an example of a process flow 600 that supports autonomous formation for backhaul networks in accordance with various aspects of the present disclosure. Process flow 600 includes relay 220-*k* and relay 220-*l*, each of which may be an example of a relay 220 described above. In this example, relay 220-*k* may represent a parent relay for relay 220-*l*. Relay 220-*k* may in turn be a child of a network node such as another relay 220 or donor 105-*e*. In the present example, relay 220-*l* has an attaching child relay 220 (not shown).

Process flow 600 illustrates a technique for autonomous DN address allocation with recursive address updates upstream. In this approach, an attaching child relay 220 autonomously may allocate a DN address for itself. Accordingly, at 605, relay 220-*l* may determine (e.g., identify) a DN address for an attaching child relay 220. This address may for instance be provisioned (e.g., like an IEEE 802.3 hardware address) or otherwise preconfigured for the attaching child relay 220. In some cases, the attaching child relay 220 may additionally or alternatively obtain a DN address via stateless address autoconfiguration (SLAAC) (e.g., in the case the PDU type is IPv6). The attaching child relay 220 may enclose its DN address in the PDU session request message of 304 and 316 described with reference to FIG. 3. As further described above, a Create Session Request may then be passed via the CN to the GW of the parent relay 220-*l*. The GW of parent relay 220-*l* may then determine the DN address (e.g., IP address, PDN address, 802.1 (LAN address, etc.) for the attaching child relay 220 by retrieving it from the Create Session Request message from the CN (e.g., described at 306 and 318 with reference to FIG. 3).

Variations to this approach may also be considered. For example, in some cases, the parent relay 220 (e.g., relay 220-*l*) may autonomously determine the DN address for the attaching child relay 220 at 605 (e.g., via SLAAC). After determination of the DN address for the attaching child relay 220, relay 220-*l* may send a DN address update at 610 to its own parent relay 220-*k*. The DN address update may propagate through the backhaul network until it reaches donor 105-*e* at 615. In some cases, the DN address update that originates at 610 and propagates at 615 may use an RRC message. Intermediate relays receiving this message may update their FIB at 620 based on the corresponding mapping. In another considered approach, reverse-path learning may be applied (e.g., such that upstream relays 220 learn the FIB mapping based on data packets send upstream).

The techniques described above with reference to FIGS. 4 through 6 may represent alternative DN address allocation (e.g., IP allocation, PDN address allocation, etc.) and FIB updates across the wireless backhaul network when new relays 220 attach. Further alternatives to the DN address allocation and FIB updating beyond these examples may also be considered without departing from the scope of the present disclosure. For example, it may be possible that a relay 220 supports multiple alternatives for DN address management and FIB updating. To ensure interoperability of relays 220 integrated into such a wireless backhaul network, each relay 220 may be advised (e.g., via a signaling message) which of these alternatives is to be used. Such signaling may be achieved in a variety of ways. For example, the signaling may be obtained from the OAM server when configuring BS and GW routing operations to integrate an attaching child relay 220 (e.g., as described at 313 and 325 with reference to FIG. 3). Additionally or alternatively, the signaling may be obtained from a network node such as a donor 105 (e.g., in the Create Session Request described at 306 and 318 with reference to FIG. 3). In yet another possible example, such signaling may be obtained from the parent relay 220 (e.g., in an RRC message described at 304, 310, 316, and 322 with reference to FIG. 3). Other alternatives and combinations are also considered.

Figure 7:
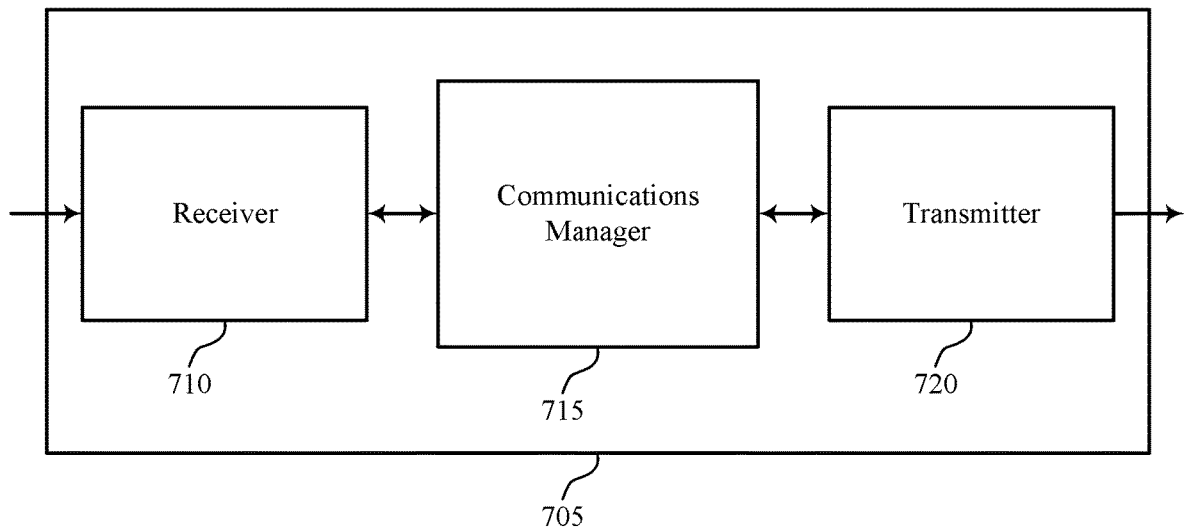
FIGS. 7 through 9 show block diagrams of a device that supports autonomous formation for backhaul networks in accordance with aspects of the present disclosure.

FIG. 7 shows a block diagram 700 of a wireless device 705 that supports autonomous formation for backhaul networks in accordance with aspects of the present disclosure. Wireless device 705 may be an example of aspects of a network node such as a network access device (e.g., gNB, ANC, RH), UE, relay, or donor as described with reference to FIGS. 1 and 2. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to autonomous formation for backhaul networks, etc.). Information may be passed on to other components of the device. The receiver 710 may be an example of aspects of the transceiver 1035 described with reference to FIG. 10. The receiver 710 may utilize a single antenna or a set of antennas.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 715 may establish a first connection to a first DN via a wireless link with a network node (e.g., a relay, a donor, a UE, gNB) and receive, from a second relay, a PDU session request. Communications manager 715 may further forward the PDU session request to a network management function, identify a DN address for the second relay, establish a second connection to a second DN for the second relay, and connect the second relay to the first DN by routing data from the first DN to the second DN based on the identified DN address.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
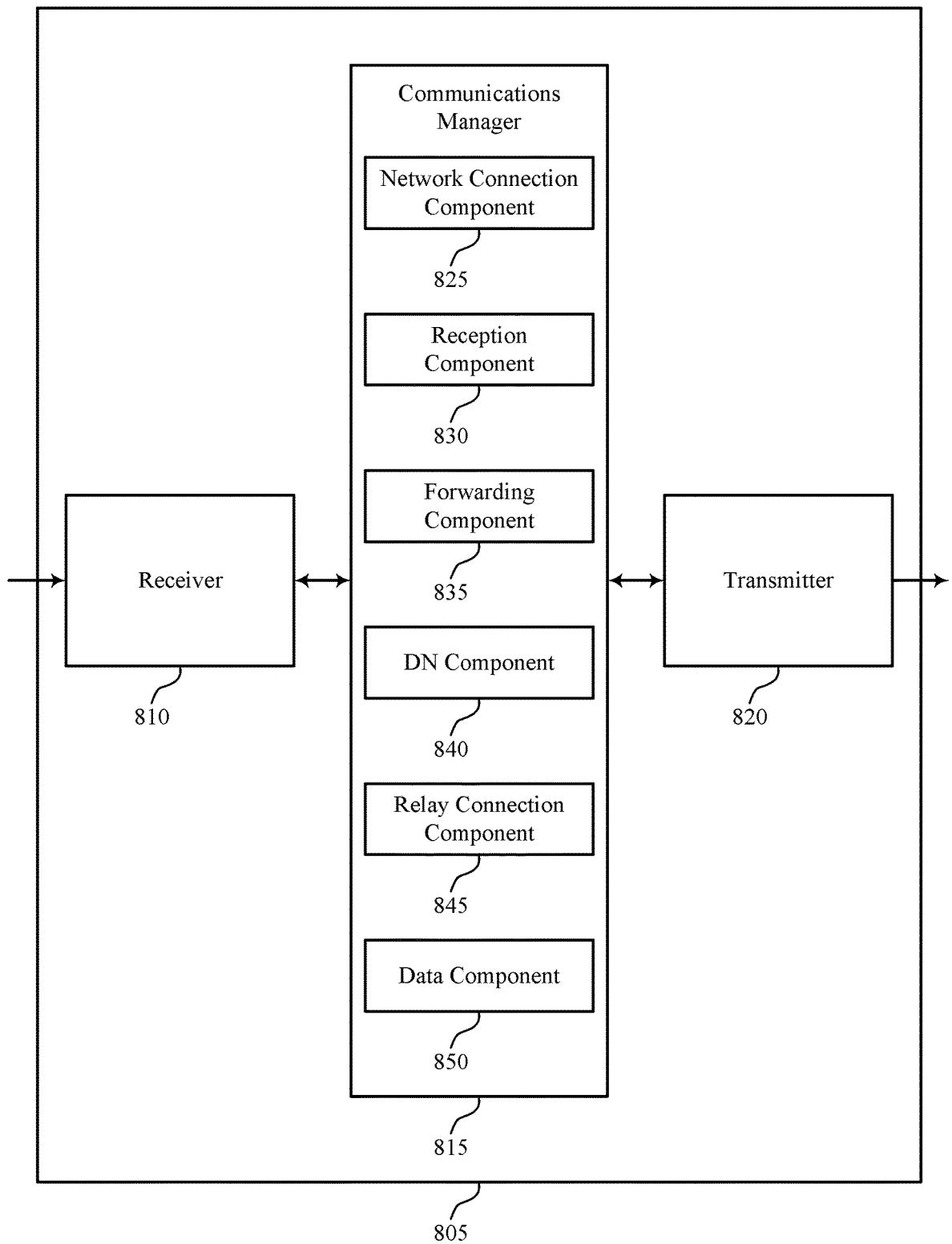

FIG. 8 shows a block diagram 800 of a wireless device 805 that supports autonomous formation for backhaul networks in accordance with aspects of the present disclosure. Wireless device 805 may be an example of aspects of a wireless device 705 or a network node such as a network access device (e.g., gNB, ANC, RH), UE, RN, relay, or donor as described with reference to FIGS. 1, 2, and 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to autonomous formation for backhaul networks, etc.). Information may be passed on to other components of the device. The receiver 810 may be an example of aspects of the transceiver 1035 described with reference to FIG. 10. The receiver 810 may utilize a single antenna or a set of antennas.

Communications manager 815 may be an example of aspects of the communications manager 1015 described with reference to FIG. 10. Communications manager 815 may also include network connection component 825, reception component 830, forwarding component 835, DN component 840, relay connection component 845, and data component 850.

Network connection component 825 may establish a first connection to a first DN via a wireless link with a network node (e.g., a relay, a donor, a UE, gNB). In some cases, establishing the first connection to the first DN may include transmitting, to the network node, an RRC connection request message.

Reception component 830 may receive, from a second relay, a PDU session request. In some cases, reception component 830 may receive, from the network management function, a request to establish a gateway function for the second relay. In some examples, reception component 830 may receive a DN address response based on the DN address request, where the DN address response indicates the DN address for the second relay. Additionally or alternatively, reception component 830 may receive, from the network node, a packet indicating the DN address for the second relay. Reception component 830 may receive, from the network node, an address management message indicating a DN address management scheme, where identifying the DN address may be based on the DN address management scheme. In some cases, reception component 830 may receive, from the network node, an address management message indicating a FIB update scheme. Reception component 830 may also receive, from the network node, an RRC response message and/or receive, from the network node, a response to the PDU session request, where the response may include a Create Session Request message. In some cases, reception component 830 may receive, from the network node, a setup request based on the Create Session Response message.

Forwarding component 835 may forward the PDU session request to a network management function and/or forward the PDU session request on the first connection. In some cases, forwarding component 835 may forward the first NAS message to the network management function and determine packet forwarding rules based on the PDU session request forwarded from the second relay to the network management function. In some cases, the network management function may reside on at least one of the network node, a CN, a RAN node, a donor node, or an anchor node. In some examples, forwarding the PDU session request may comprise including a gateway address of the first relay in the PDU session request. In some cases, the PDU session request may indicate a network name (e.g., a DNN).

DN component 840 may identify a DN address for the second relay, transmit the DN address to the second relay, and identify the DN address for the second relay (e.g., based on a Create Session Request message). In some cases, at least one of the first DN or the second DN may be one of a PDN, an IP network, a LAN, a backhaul network, a self-backhaul network, or a wireless multi-hop network. In some examples, the DN address may include an address for an IP network, an 802.1 LAN, or a PDN. In some aspects, the first DN and the second DN may be both one of a PDN, an IP network, a LAN, a backhaul network, a self-backhaul network, or a wireless multi-hop network (e.g., the first DN and second DN may be the same type of data network). In some cases, identifying the DN address may include receiving, from the network management function, a DN address prefix. In some instances, the method may further include determining the DN address for the second relay based on the DN address prefix. In some cases, the DN address may include a second DN address prefix. In some examples, the identified DN address may be preconfigured or determined via a pseudo-random function. In some instances, the DN address may be determined based on a SLAAC. In some aspects, identifying the DN address may include transmitting, to the network node, a DN address request for the second relay based on the PDU session request. In some cases, the DN address request may indicate a requested DN address for the second relay. In some examples, identifying the DN address may include determining the DN address for the second relay based on the PDU session request. In some instances, the determined DN address may include a DN address of a set of DN addresses determined based on the DN address prefix.

Relay connection component 845 may establish a second connection to a second DN for the second relay. In some cases, establishing the second connection to the second DN for the second relay may include configuring at least one DRB between the first relay and the second relay. In some aspects, establishing the second connection to the second DN may include receiving a first NAS message from the second relay, the first NAS message indicating the PDU session request.

Data component 850 may connect the second relay to the first DN by routing data from the first DN to the second DN based on the identified DN address. Data component 850 may forward the data from the network node to the second relay by exchanging the data between the first connection to the first DN and the second connection to the second DN and forward data received from the network node to the at least one DRB based on the identified DN address.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
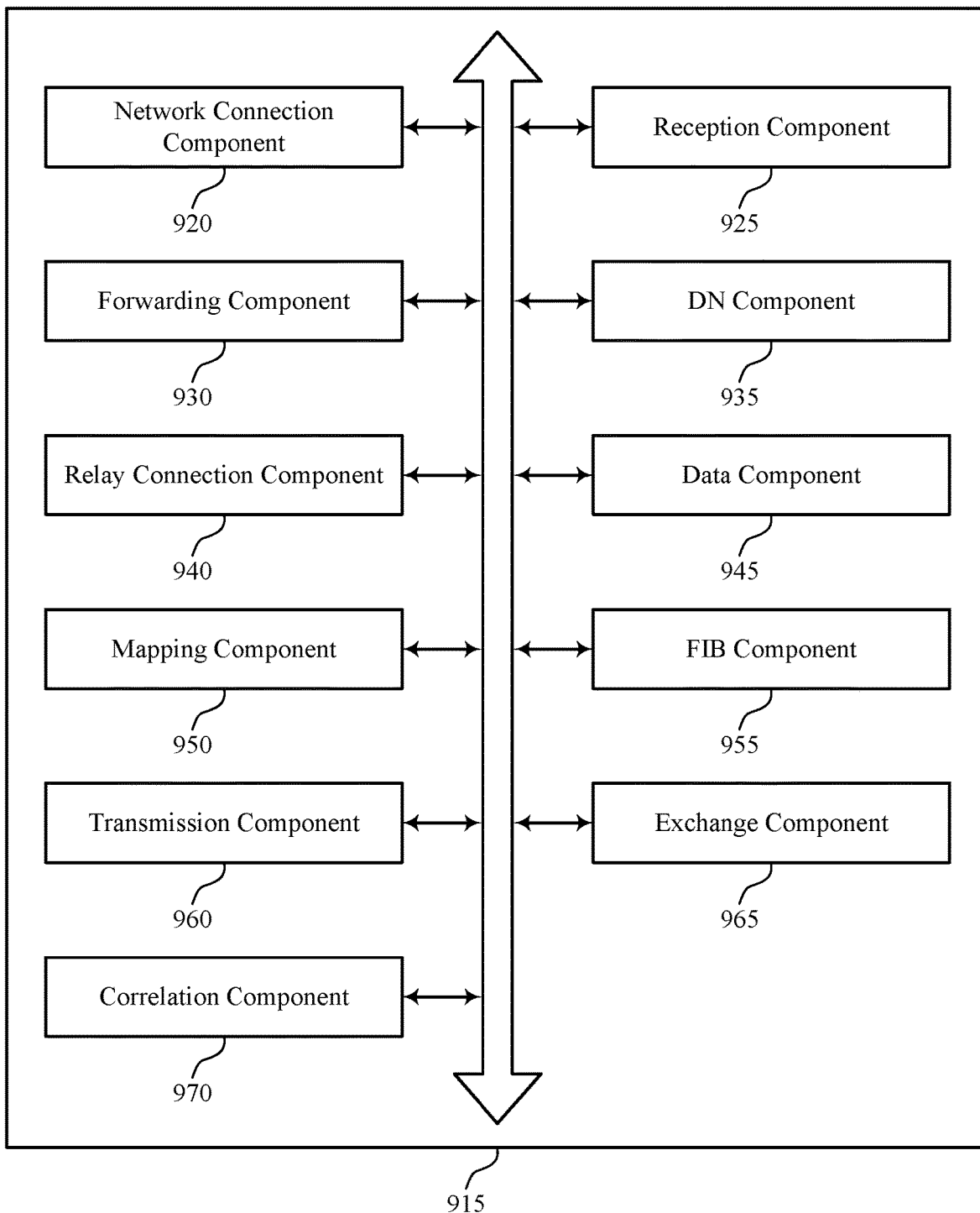

FIG. 9 shows a block diagram 900 of a communications manager 915 that supports autonomous formation for backhaul networks in accordance with aspects of the present disclosure. The communications manager 915 may be an example of aspects of a communications manager 715, a communications manager 815, or a communications manager 1015 described with reference to FIGS. 7, 8, and 10. The communications manager 915 may include network connection component 920, reception component 925, forwarding component 930, DN component 935, relay connection component 940, data component 945, mapping component 950, FIB component 955, transmission component 960, exchange component 965, and correlation component 970. Each of these modules may communicate, directly or indirectly, with one another (e.g., via one or more buses).

Network connection component 920 may establish a first connection to a first DN via a wireless link with a network node (e.g., a relay, a donor, a UE, gNB). In some cases, establishing the first connection to the first DN may include transmitting, to the network node, a RRC connection request message.

Reception component 925 may receive, from a second relay, a PDU session request. Reception component 925 may receive, from the network management function, a request to establish a gateway function for the second relay. Reception component 925 may receive a DN address response based on the DN address request, where the DN address response may indicate the DN address for the second relay. Reception component 925 may additionally or alternatively receive, from the network node, a packet indicating the DN address for the second relay. Reception component 925 may receive, from the network node, an address management message indicating a DN address management scheme, where identifying the DN address may be based on the DN address management scheme. Reception component 925 may receive, from the network node, an address management message indicating a FIB update scheme. In some examples, reception component 925 may receive, from the network node, an RRC response message. Reception component 925 may receive, from the network node, a response to the PDU session request, where the response may include a Create Session Request message. Reception component 925 may receive, from the network node, a setup request based on the Create Session Response message.

Forwarding component 930 may forward the PDU session request to a network management function. Forwarding component 930 may forward the PDU session request on the first connection. Forwarding component 930 may forward the first NAS message to the network management function, and determine packet forwarding rules based on the PDU session request forwarded from the second relay to the network management function. In some cases, the network management function may reside on at least one of the network node, a CN, a RAN node, a donor node, or an anchor node. In some cases, forwarding the PDU session request may involve including a gateway address of the first relay in the PDU session request. In some cases, the PDU session request may indicate a network name.

DN component 935 may identify a DN address for the second relay. DN component 935 may transmit the DN address to the second relay and identify the DN address for the second relay based on the Create Session Request message. In some cases, the DN address may include an address for an IP network, an 802.1 LAN, or a PDN. In some examples, at least one of the first DN or the second DN may be one of a PDN, an IP network, a LAN, a backhaul network, a self-backhaul network, or a wireless multi-hop network. In some instances, the first DN and the second DN may be both one of a PDN, an IP network, a LAN, a backhaul network, a self-backhaul network, or a wireless multi-hop network. In some aspects, identifying the DN address may include receiving, from the network management function, a DN address prefix. In some cases, determining the DN address for the second relay may be based on the DN address prefix. In some examples, the DN address may include a second DN address prefix. In some instances, at least one of the first DN or the second DN may be one of a PDN, an IP network, a LAN, a backhaul network, a self-backhaul network, or a wireless multi-hop network. In some aspects, the identified DN address may be preconfigured or determined via a pseudo-random function. In some cases, the DN address may be determined based on a SLAAC. In some examples, identifying the DN address may include transmitting, to the network node, a DN address request for the second relay based on the PDU session request. In some instances, the DN address request may indicate a requested DN address for the second relay. In some aspects, identifying the DN address may include determining the DN address for the second relay based on the PDU session request. In some cases, the determined DN address may include a DN address of a set of DN addresses determined based on the DN address prefix.

Relay connection component 940 may establish a second connection to a second DN for the second relay. In some cases, establishing the second connection to the second DN for the second relay may include configuring at least one DRB between the first relay and the second relay. In some examples, establishing the second connection to the second DN may include receiving a first NAS message from the second relay, the first NAS message indicating the PDU session request.

Data component 945 may connect the second relay to the first DN by routing data from the first DN to the second DN based on the identified DN address. Data component 945 may forward the data from the network node to the second relay by exchanging the data between the first connection to the first DN and the second connection to the second DN and forward data received from the network node to the at least one DRB based on the identified DN address.

Mapping component 950 may establish a mapping between the at least one DRB and the identified DN address for the second relay. In some cases, the mapping may be based on a correlation ID associated with the second relay.

FIB component 955 may update a FIB based on the mapping, update a FIB at the first relay based on the determined DN address. FIB component 955 may update a FIB at the first relay based on the DN address for the second relay and update a FIB based on the FIB update scheme.

Transmission component 960 may transmit, to the network node, an indication of the determined DN address for the second relay. Transmission component 960 may transmit the packet to the second relay, and transmit, to the network node, a Create Session Response message indicating the correlation ID.

Exchange component 965 may exchange one or more signaling messages between the network management function and the second relay.

Correlation component 970 may determine a correlation ID for the second relay based on the Create Session Request message.

Figure 10:
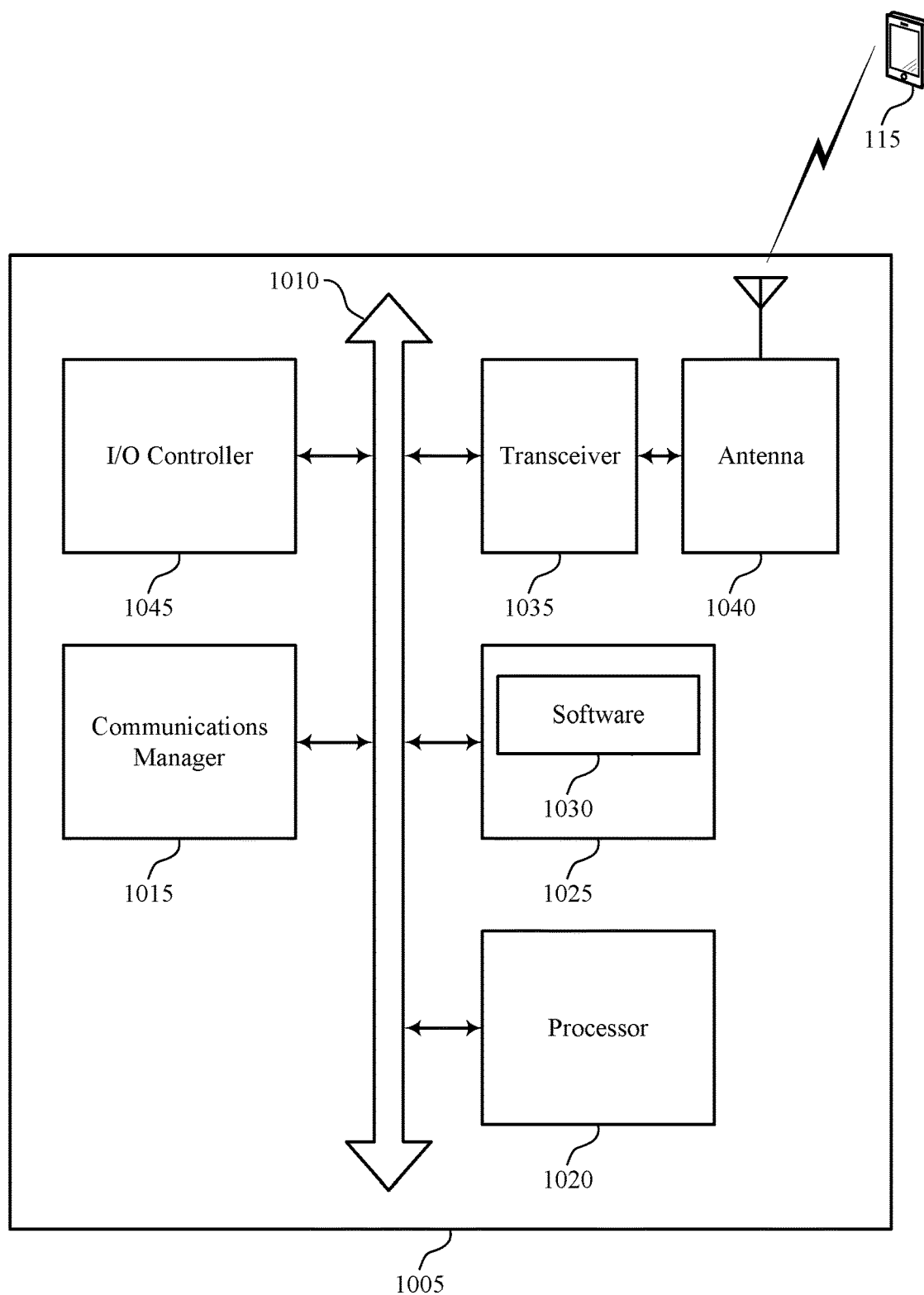
FIG. 10 illustrates a block diagram of a system including a UE that supports autonomous formation for backhaul networks in accordance with aspects of the present disclosure.

FIG. 10 shows a diagram of a system 1000 including a device 1005 that supports autonomous formation for backhaul networks in accordance with aspects of the present disclosure. Device 1005 may be an example of or include the components of wireless device 705, wireless device 805, or a network node such as a network access device (e.g., gNB, ANC, RH), UE, RN, relay, or donor, as described above, e.g., with reference to FIGS. 1, 7 and 8. Device 1005 may include components for bi-directional voice and data communications including components for transmitting and receiving communications, including communications manager 1015, processor 1020, memory 1025, software 1030, transceiver 1035, antenna 1040, and I/O controller 1045. These components may be in electronic communication via one or more busses (e.g., bus 1010).

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting autonomous formation for backhaul networks).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support autonomous formation for backhaul networks. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
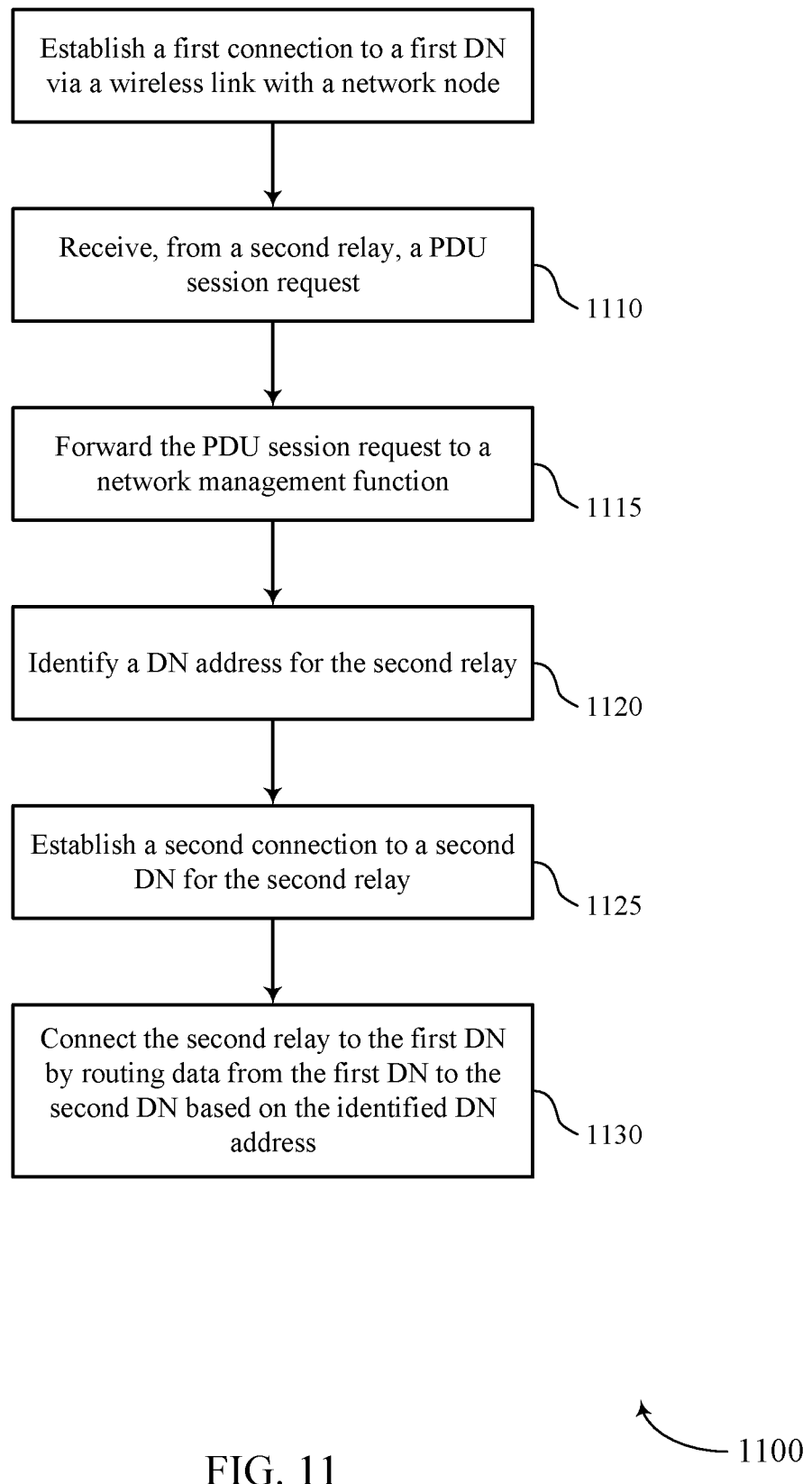
FIGS. 11 through 13 illustrate methods for autonomous formation for backhaul networks in accordance with aspects of the present disclosure.

FIG. 11 shows a flowchart illustrating a method 1100 for autonomous formation for backhaul networks in accordance with aspects of the present disclosure. The operations of method 1100 may be implemented by a network node such as a network access device (e.g., gNB, ANC, RH), UE, RN, relay, or donor or its components as described herein. For example, the operations of method 1100 may be performed by a communications manager as described with reference to FIGS. 7 through 10. In some examples, a network node such as a network access device (e.g., gNB, ANC, RH), UE, relay, or donor may execute a set of codes to control the functional elements of the device to perform the functions described below. Additionally or alternatively, the network node such as a network access device (e.g., gNB, ANC, RH), UE, relay, or donor may perform aspects of the functions described below using special-purpose hardware.

At block 1105 the network node such as a network access device (e.g., gNB, ANC, RH), UE, relay, or donor may establish a first connection to a first DN via a wireless link with a network node. The operations of block 1105 may be performed according to the methods described with reference to FIGS. 1 through 6. In certain examples, aspects of the operations of block 1105 may be performed by a network connection component as described with reference to FIGS. 7 through 10.

At block 1110 the network node such as a network access device (e.g., gNB, ANC, RH), UE, relay, or donor may receive, from a second relay, a PDU session request. The operations of block 1110 may be performed according to the methods described with reference to FIGS. 1 through 6. In certain examples, aspects of the operations of block 1110 may be performed by a reception component as described with reference to FIGS. 7 through 10.

At block 1115 the network node such as a network access device (e.g., gNB, ANC, RH), UE, relay, or donor may forward the PDU session request to a network management function. The operations of block 1115 may be performed according to the methods described with reference to FIGS. 1 through 6. In certain examples, aspects of the operations of block 1115 may be performed by a forwarding component as described with reference to FIGS. 7 through 10.

At block 1120 the network node such as a network access device (e.g., gNB, ANC, RH), UE, relay, or donor may identify a DN address for the second relay. The operations of block 1120 may be performed according to the methods described with reference to FIGS. 1 through 6. In certain examples, aspects of the operations of block 1120 may be performed by a DN component as described with reference to FIGS. 7 through 10.

At block 1125 the network node such as a network access device (e.g., gNB, ANC, RH), UE, relay, or donor may establish a second connection to a second DN for the second relay. The operations of block 1125 may be performed according to the methods described with reference to FIGS. 1 through 6. In certain examples, aspects of the operations of block 1125 may be performed by a relay connection component as described with reference to FIGS. 7 through 10.

At block 1130 the network node such as a network access device (e.g., gNB, ANC, RH), UE, relay, or donor may connect the second relay to the first DN by routing data from the first DN to the second DN based at least in part on the identified DN address. The operations of block 1130 may be performed according to the methods described with reference to FIGS. 1 through 6. In certain examples, aspects of the operations of block 1130 may be performed by a data component as described with reference to FIGS. 7 through 10.

Figure 12:
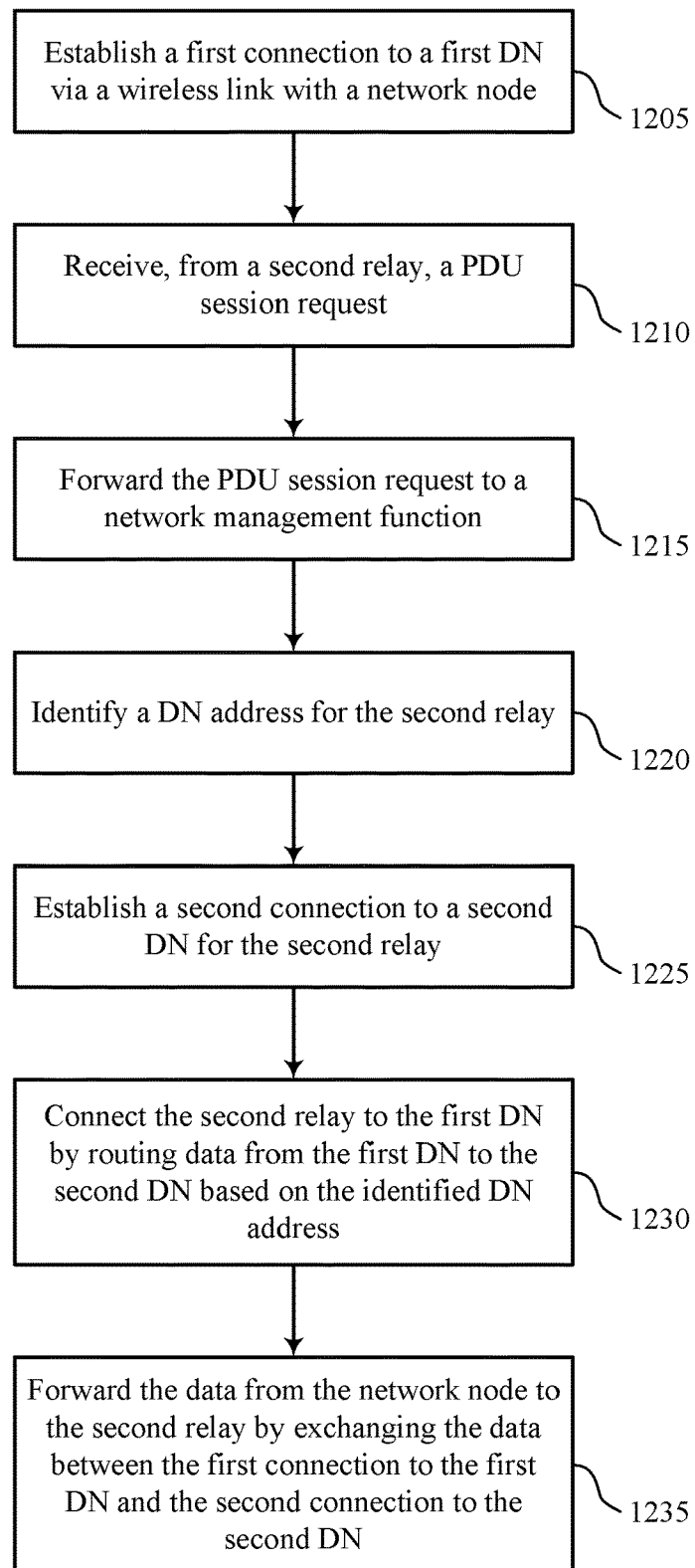

FIG. 12 shows a flowchart illustrating a method 1200 for autonomous formation for backhaul networks in accordance with aspects of the present disclosure. The operations of method 1200 may be implemented by a network node such as a network access device (e.g., gNB, ANC, RH), UE, relay, or donor or its components as described herein. For example, the operations of method 1200 may be performed by a communications manager as described with reference to FIGS. 7 through 10. In some examples, a network node such as a network access device (e.g., gNB, ANC, RH), UE, relay, or donor may execute a set of codes to control the functional elements of the device to perform the functions described below. Additionally or alternatively, the network node such as a network access device (e.g., gNB, ANC, RH), UE, relay, or donor may perform aspects of the functions described below using special-purpose hardware.

At block 1205 the network node such as a network access device (e.g., gNB, ANC, RH), UE, relay, or donor may establish a first connection to a first DN via a wireless link with a network node. The operations of block 1205 may be performed according to the methods described with reference to FIGS. 1 through 6. In certain examples, aspects of the operations of block 1205 may be performed by a network connection component as described with reference to FIGS. 7 through 10.

At block 1210 the network node such as a network access device (e.g., gNB, ANC, RH), UE, relay, or donor may receive, from a second relay, a PDU session request. The operations of block 1210 may be performed according to the methods described with reference to FIGS. 1 through 6. In certain examples, aspects of the operations of block 1210 may be performed by a reception component as described with reference to FIGS. 7 through 10.

At block 1215 the network node such as a network access device (e.g., gNB, ANC, RH), UE, relay, or donor may forward the PDU session request to a network management function. The operations of block 1215 may be performed according to the methods described with reference to FIGS. 1 through 6. In certain examples, aspects of the operations of block 1215 may be performed by a forwarding component as described with reference to FIGS. 7 through 10.

At block 1220 the network node such as a network access device (e.g., gNB, ANC, RH), UE, relay, or donor may identify a DN address for the second relay. The operations of block 1220 may be performed according to the methods described with reference to FIGS. 1 through 6. In certain examples, aspects of the operations of block 1220 may be performed by a DN component as described with reference to FIGS. 7 through 10.

At block 1225 the network node such as a network access device (e.g., gNB, ANC, RH), UE, relay, or donor may establish a second connection to a second DN for the second relay. The operations of block 1225 may be performed according to the methods described with reference to FIGS. 1 through 6. In certain examples, aspects of the operations of block 1225 may be performed by a relay connection component as described with reference to FIGS. 7 through 10.

At block 1230 the network node such as a network access device (e.g., gNB, ANC, RH), UE, relay, or donor may connect the second relay to the first DN by routing data from the first DN to the second DN based at least in part on the identified DN address. The operations of block 1230 may be performed according to the methods described with reference to FIGS. 1 through 6. In certain examples, aspects of the operations of block 1230 may be performed by a data component as described with reference to FIGS. 7 through 10.

At block 1235 the network node such as a network access device (e.g., gNB, ANC, RH), UE, relay, or donor may forward the data from the network node to the second relay by exchanging the data between the first connection to the first DN and the second connection to the second DN. The operations of block 1235 may be performed according to the methods described with reference to FIGS. 1 through 6. In certain examples, aspects of the operations of block 1235 may be performed by a data component as described with reference to FIGS. 7 through 10.

Figure 13:
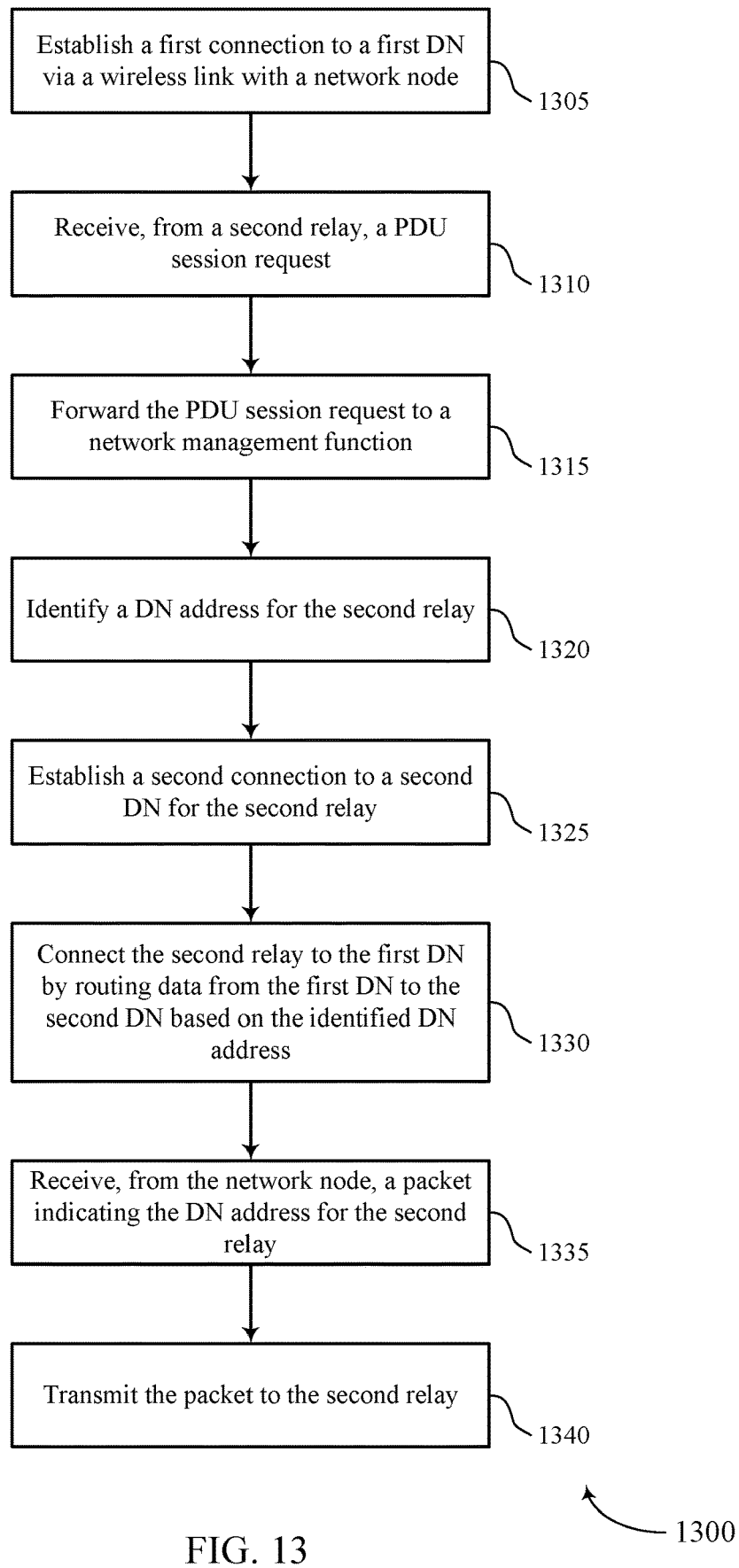

FIG. 13 shows a flowchart illustrating a method 1300 for autonomous formation for backhaul networks in accordance with aspects of the present disclosure. The operations of method 1300 may be implemented by a network node such as a network access device (e.g., gNB, ANC, RH), UE, relay, or donor or its components as described herein. For example, the operations of method 1300 may be performed by a communications manager as described with reference to FIGS. 7 through 10. In some examples, a network node such as a network access device (e.g., gNB, ANC, RH), UE, relay, or donor may execute a set of codes to control the functional elements of the device to perform the functions described below. Additionally or alternatively, the network node such as a network access device (e.g., gNB, ANC, RH), UE, relay, or donor may perform aspects of the functions described below using special-purpose hardware.

At block 1305 the network node such as a network access device (e.g., gNB, ANC, RH), UE, relay, or donor may establish a first connection to a first DN via a wireless link with a network node. The operations of block 1305 may be performed according to the methods described with reference to FIGS. 1 through 6. In certain examples, aspects of the operations of block 1305 may be performed by a network connection component as described with reference to FIGS. 7 through 10.

At block 1310 the network node such as a network access device (e.g., gNB, ANC, RH), UE, relay, or donor may receive, from a second relay, a PDU session request. The operations of block 1310 may be performed according to the methods described with reference to FIGS. 1 through 6. In certain examples, aspects of the operations of block 1310 may be performed by a reception component as described with reference to FIGS. 7 through 10.

At block 1315 the network node such as a network access device (e.g., gNB, ANC, RH), UE, relay, or donor may forward the PDU session request to a network management function. The operations of block 1315 may be performed according to the methods described with reference to FIGS. 1 through 6. In certain examples, aspects of the operations of block 1315 may be performed by a forwarding component as described with reference to FIGS. 7 through 10.

At block 1320 the network node such as a network access device (e.g., gNB, ANC, RH), UE, relay, or donor may identify a DN address for the second relay. The operations of block 1320 may be performed according to the methods described with reference to FIGS. 1 through 6. In certain examples, aspects of the operations of block 1320 may be performed by a DN component as described with reference to FIGS. 7 through 10.

At block 1325 the network node such as a network access device (e.g., gNB, ANC, RH), UE, relay, or donor may establish a second connection to a second DN for the second relay. The operations of block 1325 may be performed according to the methods described with reference to FIGS. 1 through 6. In certain examples, aspects of the operations of block 1325 may be performed by a relay connection component as described with reference to FIGS. 7 through 10.

At block 1330 the network node such as a network access device (e.g., gNB, ANC, RH), UE, relay, or donor may connect the second relay to the first DN by routing data from the first DN to the second DN based at least in part on the identified DN address. The operations of block 1330 may be performed according to the methods described with reference to FIGS. 1 through 6. In certain examples, aspects of the operations of block 1330 may be performed by a data component as described with reference to FIGS. 7 through 10.

At block 1335 the network node such as a network access device (e.g., gNB, ANC, RH), UE, relay, or donor may receive, from the network node, a packet indicating the DN address for the second relay. The operations of block 1335 may be performed according to the methods described with reference to FIGS. 1 through 6. In certain examples, aspects of the operations of block 1335 may be performed by a reception component as described with reference to FIGS. 7 through 10.

At block 1340 the network node such as a network access device (e.g., gNB, ANC, RH), UE, relay, or donor may transmit the packet to the second relay. The operations of block 1340 may be performed according to the methods described with reference to FIGS. 1 through 6. In certain examples, aspects of the operations of block 1340 may be performed by a transmission component as described with reference to FIGS. 7 through 10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first relay, comprising:
    establishing a first connection to a first data network (DN) via a wireless link with a network node;
    receiving, from a second relay, a packet data unit (PDU) session request;
    forwarding the PDU session request to a network management function;
    identifying, based at least in part on the PDU session request, a DN address for the second relay via a wireless link with a second network node, wherein identifying the DN address further comprises receiving, from the network management function, a DN address prefix, determining the DN address for the second relay based at least in part on the DN address prefix, and transmitting the DN address to the second relay;
    establishing a second connection to a second DN for the second relay; and
    connecting the second relay to the first DN by routing data from the first DN to the second relay via the second DN based at least in part on the identified DN address.

2. The method of claim 1, wherein at least one of the first DN or the second DN is one of a packet data network (PDN), an Internet Protocol (IP) network, a local area network (LAN), a backhaul network, a self-backhaul network, or a wireless multi-hop network.

3. The method of claim 1, further comprising:
    updating a forwarding information base (FIB) at the first relay based at least in part on the determined DN address.

4. The method of claim 1, wherein the determined DN address comprises a DN address of a set of DN addresses determined based at least in part on the DN address prefix.

5. The method of claim 1, wherein the identified DN address is preconfigured or determined via a pseudo-random function.

6. The method of claim 5, wherein the DN address is determined based at least in part on a stateless address autoconfiguration (SLAAC).

7. The method of claim 1, wherein identifying the DN address comprises:

transmitting, to the network node, a DN address request for the second relay based at least in part on the PDU session request; and receiving a DN address response based at least in part on the DN address request, wherein the DN address response indicates the DN address for the second relay.

8. The method of claim 7, wherein the DN address request indicates a requested DN address for the second relay.

9. The method of claim 7, further comprising:
updating a forwarding information base (FIB) at the first relay based at least in part on the DN address for the second relay.

10. The method of claim 1, wherein identifying the DN address comprises:
determining the DN address for the second relay based at least in part on the PDU session request; and
transmitting, to the network node, an indication of the determined DN address for the second relay.

11. The method of claim 1, further comprising:
receiving, from the network node, an address management message indicating a DN address management scheme, wherein identifying the DN address is based at least in part on the DN address management scheme.

12. The method of claim 1, further comprising:
receiving, from the network node, an address management message indicating a forwarding information base (FIB) update scheme; and
updating a FIB based at least in part on the FIB update scheme.

13. The method of claim 1, wherein the PDU session request indicates a network name.

14. The method of claim 1, wherein:
the DN address comprises an address for an Internet Protocol (IP) network, an 802.1 local area network (LAN), or a packet data network (PDN).

15. An apparatus for wireless communication, comprising:
means for establishing a first connection to a first data network (DN) via a wireless link with a network node;
means for receiving, from a relay, a packet data unit (PDU) session request;
means for forwarding the PDU session request to a network management function;
means for identifying, based at least in part on the PDU session request, a DN address for the relay via a wireless link with a second network node, wherein the means for identifying the DN address comprises means for receiving, from the network management function, a DN address prefix, means for determining the DN address for the second relay based at least in part on the DN address prefix, and means for transmitting the DN address to the second relay;
means for establishing a second connection to a second DN for the relay; and
means for connecting the relay to the first DN by routing data from the first DN to the relay via the second DN based at least in part on the identified DN address.

16. An apparatus for wireless communication, in a system comprising:
a processor;
memory in electronic communication with the processor; and
instructions stored in the memory and operable, when executed by the processor, to cause the apparatus to:
establish a first connection to a first data network (DN) via a wireless link with a network node;
receive, from a relay, a packet data unit (PDU) session request;
forward the PDU session request to a network management function;
identify, based at least in part on the PDU session request, a DN address for the relay via a wireless link with a second network node, wherein the instructions, when executed by the processor, are further operable to cause the apparatus to receive, from the network management function, a DN address prefix, determine the DN address for the second relay based at least in part on the DN address prefix, and transmit the DN address to the second relay;
establish a second connection to a second DN for the relay; and
connect the relay to the first DN by routing data from the first DN to the second relay via the second DN based at least in part on the identified DN address.

17. A non-transitory computer readable medium storing code for wireless communication, the code comprising instructions executable by a processor to:
establish a first connection to a first data network (DN) via a wireless link with a network node;
receive, from a relay, a packet data unit (PDU) session request;
forward the PDU session request to a network management function;
identify, based at least in part on the PDU session request, a DN address for the relay via a wireless link with a second network node, wherein the code further comprises instructions executable by the processor to receive, from the network management function, a DN address prefix, determine the DN address for the second relay based at least in part on the DN address prefix, and transmit the DN address to the second relay;
establish a second connection to a second DN for the relay; and
connect the relay to the first DN by routing data from the first DN to the second relay via the second DN based at least in part on the identified DN address.

* * * * *